United States Patent [19]

Ortyn et al.

[11] Patent Number: 5,499,097
[45] Date of Patent: Mar. 12, 1996

[54] METHOD AND APPARATUS FOR CHECKING AUTOMATED OPTICAL SYSTEM PERFORMANCE REPEATABILITY

[75] Inventors: William E. Ortyn, Devall; Joseph Arnone, Bainbridge Island, both of Wash.

[73] Assignee: NeoPath, Inc., Redmond, Wash.

[21] Appl. No.: 308,140

[22] Filed: Sep. 19, 1994

[51] Int. Cl.$^6$ ............................. G01B 11/00; G01B 11/14
[52] U.S. Cl. .......................... 356/372; 356/375; 356/401
[58] Field of Search .................................. 356/372, 375, 356/400–401; 359/391–394

[56] References Cited

U.S. PATENT DOCUMENTS

| | | | |
|---|---|---|---|
| 4,012,111 | 3/1977 | Masterson | 359/391 |
| 4,012,112 | 3/1977 | Masterson | 359/393 |
| 4,019,819 | 4/1977 | Lodzinski | 356/73 |
| 4,029,949 | 6/1977 | Dew | 364/167.01 |
| 4,159,874 | 7/1979 | Dearth et al. | 356/73 |
| 4,239,395 | 12/1980 | Modisette | 356/443 |
| 4,288,160 | 9/1981 | Lodzinski | 356/73 |
| 4,513,438 | 4/1985 | Graham et al. | 356/39 |
| 4,618,938 | 10/1986 | Sandland et al. | 364/552 |
| 4,647,764 | 3/1987 | Chadwick et al. | 359/381 |
| 5,103,338 | 4/1992 | Crowley et al. | 359/394 |
| 5,153,745 | 10/1992 | Brandkamp et al. | 358/406 |
| 5,294,805 | 3/1994 | Izraelev | 250/570 |
| 5,315,700 | 5/1994 | Johnston et al. | 395/163 |
| 5,323,528 | 6/1994 | Baker | 29/721 |

*Primary Examiner*—Frank Gonzalez
*Assistant Examiner*—Jason D. Eisenberg
*Attorney, Agent, or Firm*—Leone & Moffa

[57] ABSTRACT

A test checks for appropriate positioning of priority fields for image collection and evaluation. The tests characterize lateral repeatability of stage movement in an X-Y plane, the longitudinal repeatability of the stage along a Z axis, cross coupling of motion in the Z direction from the X-Y stage movement, repeatability of the microscope objective turret positioning, mechanical centration of optical paths and the parfocality of optical paths. The process includes moving to a rough location, performing focus pans to determine the best focus and searching for a known object to register coordinate locations, processing those locations to determine the repeatability and accuracy of the motion system. Further, a means of evaluating these parameters is disclosed by which an automated cytology instrument will validate or invalidate data taken since the last position integrity check.

17 Claims, 17 Drawing Sheets

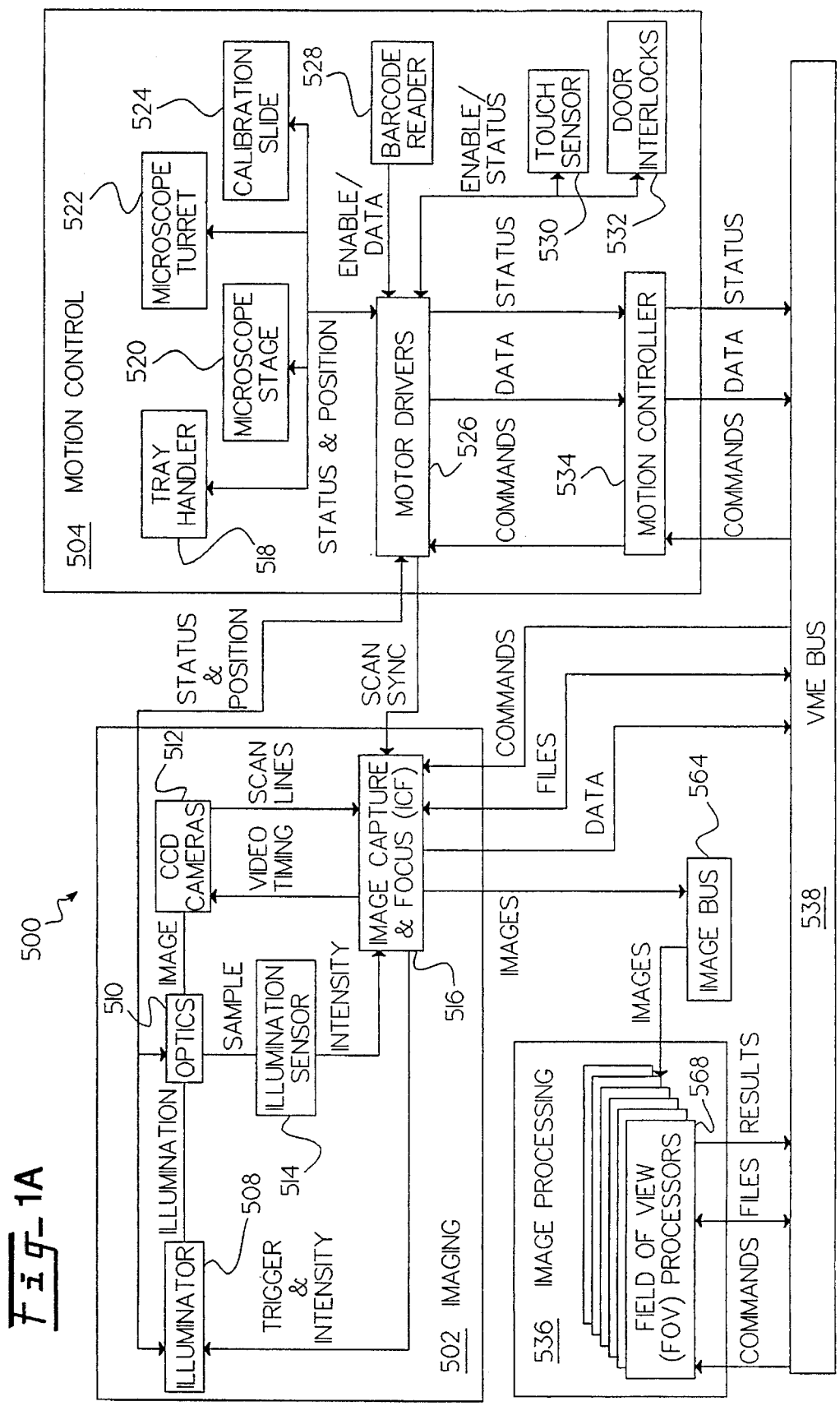

Fig_ 3

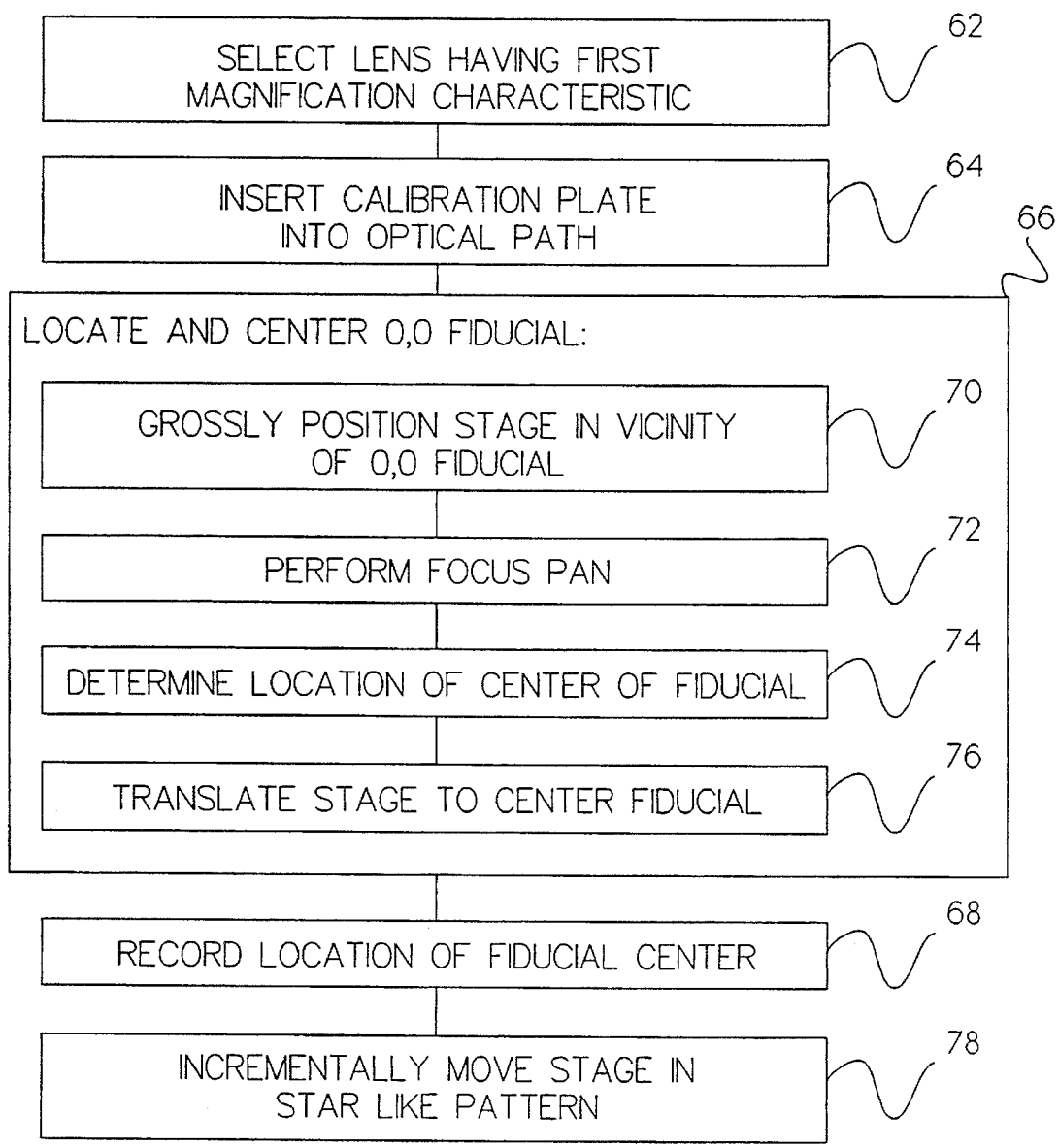
Fig_ 6A

METHOD AND APPARATUS FOR CHECKING AUTOMATED OPTICAL SYSTEM PERFORMANCE REPEATABILITY

FIELD OF THE INVENTION

The present invention relates to an automated method for evaluation of positioning system performance in automated machine vision instruments. More specifically, the invention provides an automated test method conducted during operation of an automated microscope system. Still more specifically, the automated test of the invention characterizes lateral repeatability of stage movement in an X-Y plane, longitudinal repeatability of the stage along a Z axis, cross coupling of motion in the Z direction from movement in the X-Y plane, repeatability of movement of a microscope objective turret, mechanical centration of optical paths, and parfocality of optical paths in an instrument performing automated analysis of biological specimens such as, for example, Pap smears.

BACKGROUND OF INVENTION

Automated analysis of biological specimens requires a high degree of repeatability and accuracy from the motion systems that position specimens in the instrument. Repeatability and accuracy errors can decrease throughput and, in the worst case, cause low prevalence data to be missed. Therefore, it is critical that motion systems employed in automated biological analysis machines perform above or beyond the engineered limits of the design.

For automated biological analysis applications, such as for Pap smear analysis, repeatability of movement of a microscope slide stage in the X,Y plane, or horizontal plane, is extremely important. In such systems prioritized images may be selected under low power magnification and are relocated under high power magnification for review. In one example of an automated biological analysis system as manufactured by NeoPath, Inc. of Bellevue, Wash. a low power 4× field of view is divided into a 5×5 matrix of high power 20× fields. Each 4× subfield (or 20× field) is analyzed for further review. If the results dictate further inspection, the system reviews the subfield with the 20× magnification. Thus, stage repeatability becomes most critical when an object of interest in a 4× subfield lies near the subfield boundary. In such a case, poor XY stage repeatability may cause the high power 20× review to miss a suspect object. Therefore, it is one motive of the present invention to provide an X,Y repeatability test. As contemplated by the present invention, an X,Y repeatability test is conducted to verify that stage performance meets engineered limits.

The method of the present invention ensures that priority fields of the low power scan are appropriately positioned under a high power objective for image collection and evaluation. The invention provides a process and apparatus suitable for characterizing lateral repeatability of the X-Y stage, the longitudinal repeatability of the Z stage, the cross coupling of motion in the Z direction from the X-Y stage, the repeatability of the microscope objective turret, the mechanical centration of optical paths and the parfocality of optical paths. This process involves moving to a rough location, performing focus pans to determine the best focus and searching for a known object to register coordinate locations, processing those locations to determine the repeatability and accuracy of the motion system. Further, a means of evaluating these parameters is disclosed by which the automated cytology instrument will validate or invalidate data taken since the last position integrity check.

In a presently preferred embodiment of the invention, the camera system disclosed herein is used in a system for analyzing cervical pap smears, such as that shown and disclosed in U.S. patent application Ser. No. 07/838,064, entitled "Method For Identifying Normal Biomedical Specimens", by Alan C. Nelson, et al., filed Feb. 18, 1992; U.S. patent application Ser. No. 07/838,395, entitled "Method For Identifying Objects Using Data Processing Techniques", by S. James Lee, et al., filed Feb. 18, 1992; U.S. patent application Ser. No. 07/838,070, now U.S. Pat. No. 5,315,700, entitled "Method And Apparatus For Rapidly Processing Data Sequences", by Richard S. Johnston, et al., filed Feb. 18, 1992; U.S. Patent Application Ser. No. 07/838,065, filed February 18, 1992, entitled "Method and Apparatus for Dynamic Correction of Microscopic Image Signals" by Jon W. Hayenga, et al.; and U.S. patent application attorney's docket No. 9/1799, filed Sep. 7, 1994 entitled "Method and Apparatus for Rapid Capture of Focused Microscopic Images" to Hayenga, et al., which is a continuation-in-part of application Ser. No. 07/838,063 filed on Feb. 18, 1992 the disclosures of which are incorporated herein, in their entirety, by the foregoing references thereto.

SUMMARY OF THE INVENTION

The present invention provides a test that checks for appropriate positioning of priority fields selected by a first low power scan and rescanned under a high power objective for image collection and evaluation. The invention provides a process and apparatus suitable for characterizing lateral repeatability of motion of a stage in an X-Y plane, the longitudinal repeatability of the stage motion along a Z direction, cross coupling of motion in the Z direction from the stage movement in the X-Y plane, repeatability of microscope objective turret motion, mechanical centration of optical paths and the parfocality of optical paths.

In one aspect of the invention, the process includes the steps of moving to a rough location, performing focus pans to determine the best focus and searching for a known object to register coordinate locations, processing those locations to determine the repeatability and accuracy of the motion system. Further, a means of evaluating these parameters is disclosed by which an automated cytology instrument or the like will validate or invalidate data taken since the last position integrity check.

It is one object of the invention to provide a means to characterize XY stage repeatability.

It is another object of the invention to provide a means to characterize XY stage repeatability during run time with no additional instrumentation.

It is yet a further object of the invention to provide a means to characterize Z stage cross coupling.

It is still a further object of this invention to provide a means to characterize Z stage repeatability.

It is yet another object of this invention to provide a means to characterize turret repeatability.

It is still a further object of this invention to provide a means to characterize centration and parfocality.

Other objects, features and advantages of the present invention will become apparent to those skilled in the art through the description of the preferred embodiment, claims and drawings herein wherein like numerals refer to like elements.

BRIEF DESCRIPTION OF THE DRAWINGS

To illustrate this invention, a preferred embodiment will be described herein with reference to the accompanying drawings.

FIG. 1A and FIG. 1B show an automated cytology system and the placement of a calibration and test target into an optical path of an automated microscope as employed by the method and apparatus of the invention.

FIGS. 6A and 6B show a flow diagram of one method of the invention for checking stage movement repeatability.

DETAILED DESCRIPTION OF THE PREFERRED EMBODIMENT

This invention consists of a suite of tests to characterize the performance of the motion system during operation without the use of any additional instrumentation. These tests refer specifically to an open loop stepper motor lead screw driven system. However, the concepts can be employed to other motion systems using components such as DC motors servo motors, linear motors, belt driven systems, and other similar motive devices.

Figure 1B:
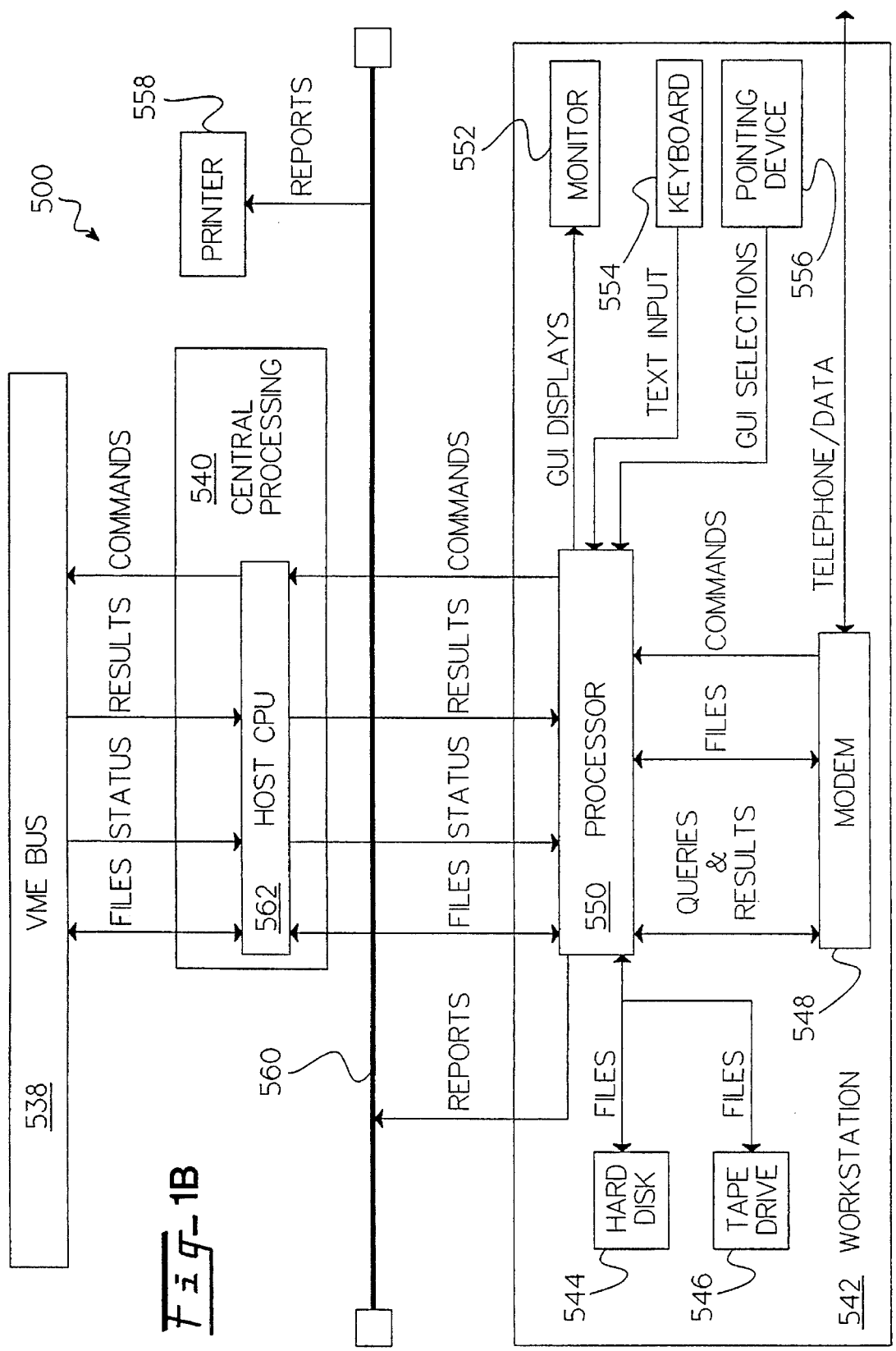

Now refer to FIGS. 1A and 1B which show a schematic diagram of one embodiment of the apparatus of the invention for checking position integrity for an automated microscope. While the method and apparatus of the invention will be discussed in terms of an example herein related to an automated cytology apparatus, it will be understood that the invention is not so limited. The features and principles of the invention may be applied to check urine analysis processes, semiconductor process defects, liquid crystal devices and other types of processing systems employing, for example, continuous arc lamps, filament lamps, laser sources, tube cameras, PIN diodes and photomultiplier tubes.

The apparatus of the invention comprises an imaging system 502, a motion control system 504, an image processing system 536, a central processing system 540, and a workstation 542. The imaging system 502 is comprised of an illuminator 508, imaging optics 510, a CCD camera 512, an illumination sensor 514 and an image capture and focus system 516. The image capture and focus system 516 provides video timing data to the CCD cameras 512, the CCD cameras 512 provide images comprising scan lines to the image capture and focus system 516. An illumination sensor intensity is provided to the image capture and focus system 516 where an illumination sensor 514 receives the sample of the image from the optics 510. In one embodiment of the invention, the optics may further comprise an automated microscope. The illuminator 508 provides illumination of a slide. The image capture and focus system 516 provides data to a VME bus 538. The VME bus distributes the data to an image processing system 536. The image processing system 536 is comprised of field-of-view processors 568. The images are sent along the image bus 564 from the image capture and focus system 516. A central processor 540 controls the operation of the invention through the VME bus 538. In one embodiment the central processor 562 comprises a Motorola 68030 CPU. The motion controller 504 is comprised of a tray handler 518, a microscope stage controller 520, a microscope turret controller 522, and a calibration slide 524. The motor drivers 526 position the slide under the optics. A bar code reader 528 reads a barcode located on the slide 524. A touch sensor 530 determines whether a slide is under the microscope objectives, and a door interlock 532 prevents operation in case the doors are open. Motion controller 534 controls the motor drivers 526 in response to the central processor 540. An Ethernet (™) communication system 560 communicates to a workstation 542 to provide control of the system. A hard disk 544 is controlled by workstation processor 550. In one embodiment, workstation 542 may comprise a Sun Sparc Classic (™) workstation. A tape drive 546 is connected to the workstation processor 550 as well as a modem 548, a monitor 552, a keyboard 554, and a mouse pointing device 556. A printer 558 is connected to the Ethernet (™) network 560.

During position integrity checking, the central computer 540, running a real time operating system, controls the automated microscope and the processor to acquire and digitize images from the microscope. The flatness of the slide may be checked, for example, by contacting the four corners of the slide using a computer controlled touch sensor. The computer 540 also controls the microscope stage to position the specimen under the microscope objective, and from one to 15 field of view (FOV) processors 568 which receive images under control of the computer 540.

Figure 2:
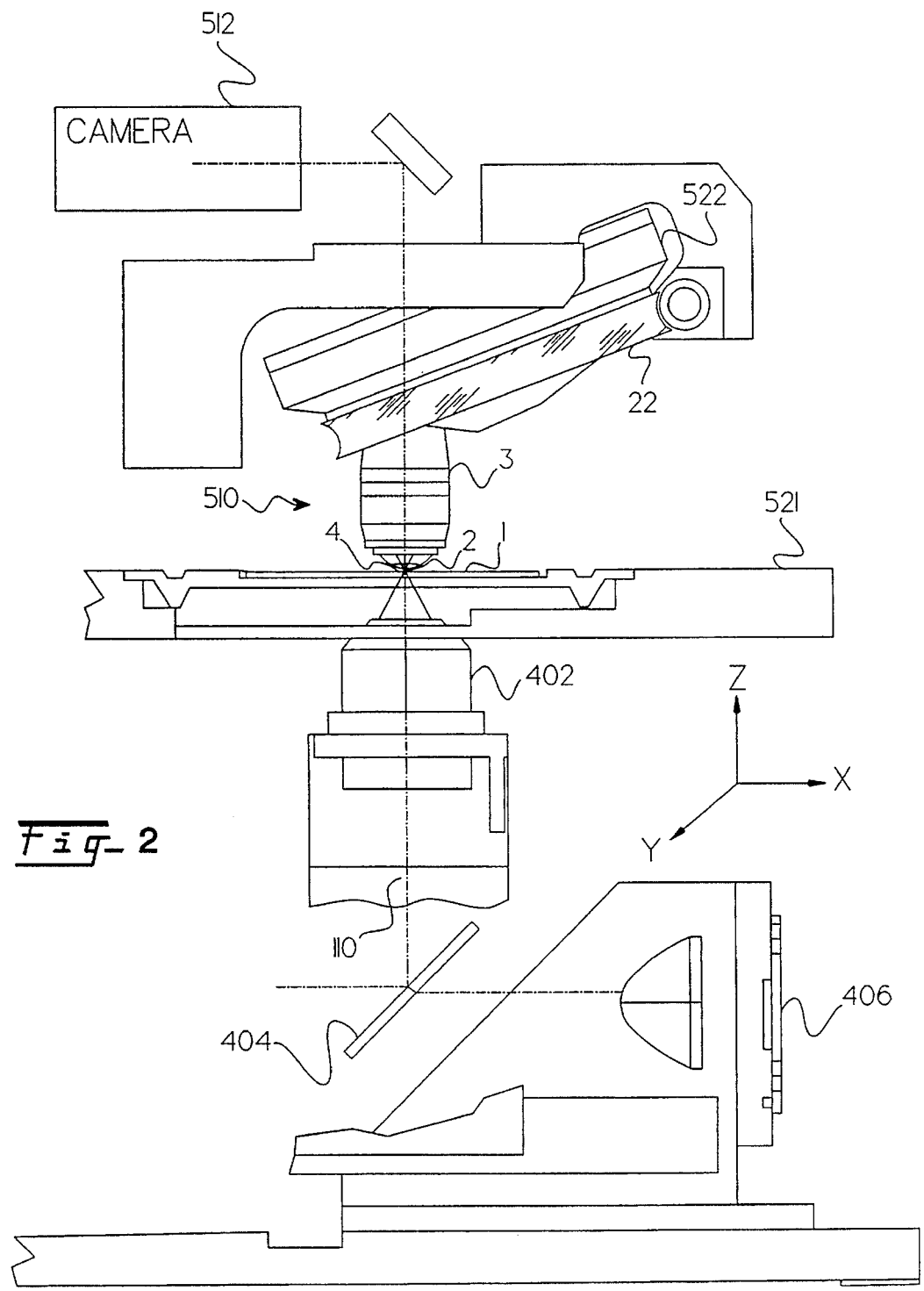
FIG. 2 schematically shows an automated microscope of the type used in automated cytological system having a calibration plate mounted on a movable stage.

Referring now to FIG. 2, there shown is placement of a calibration and test target 1 into an optical path of an automated microscope 3 having a turret 22. The calibration and test target may be mounted on a stage 521 substantially in a horizontal X,Y plane which intersects the optical path. The stage 521 is movable in the X,Y plane as well as along a Z axis which is perpendicular to the X,Y plane and which is parallel to the optical axis of the automated microscope. The turret 22 may comprise multiple objective lenses as is well known in the art. The microscope turret control 522 provides signals in a well known manner for positioning a selected objective lens into position for viewing a slide, for example.

Figure 3:
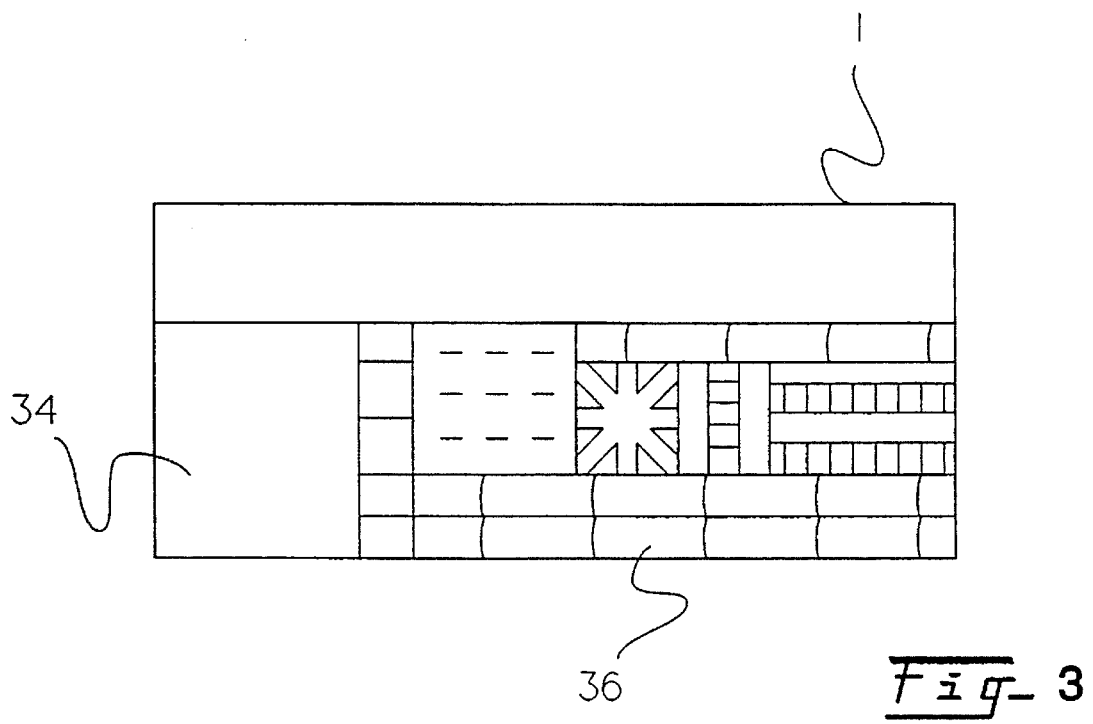
FIG. 3 shows one example of a calibration and test target or plate as used in one aspect of the invention.
Figure 4:
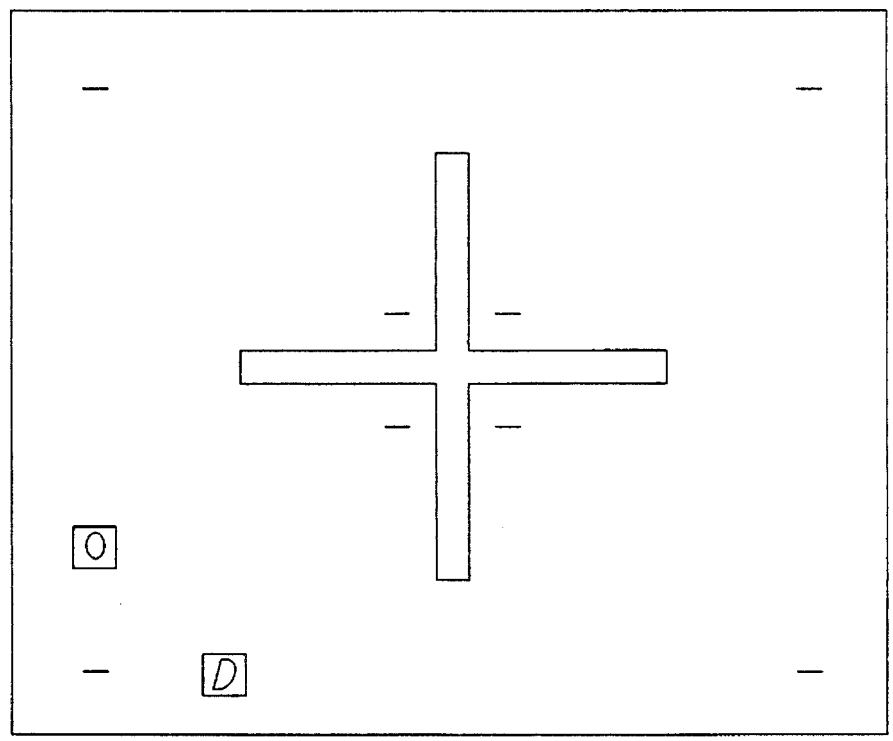
FIG. 4 shows an example of a fiducial marking.

Referring now to FIG. 3 one example of a calibration and test target is shown. Several of the processes employed by the present invention require a calibration and target plate. In the case of a transmission microscope, the calibration and test target 1 may comprise a piece of glass approximately 1.45 mm thick. The calibration and test target advantageously comprises specified clear areas 34 and image primitives such as horizontal and vertical bar targets 36. Other types of calibration markings, such as fiducial markings, may also be used. FIG. 4 shows an example of a fiducial marking. Such calibration and test target plates may be used for most transmission microscopes to simulate the optical path difference effects introduced by the substrate, coverslip and specimen media. In some embodiments of the invention, the calibration and test target may be advantageously mounted onto a conventional cantilever arm for ease of placement onto and removal from the stage.

X,Y Repeatability and Z Cross Coupling Test

Figure 6B:
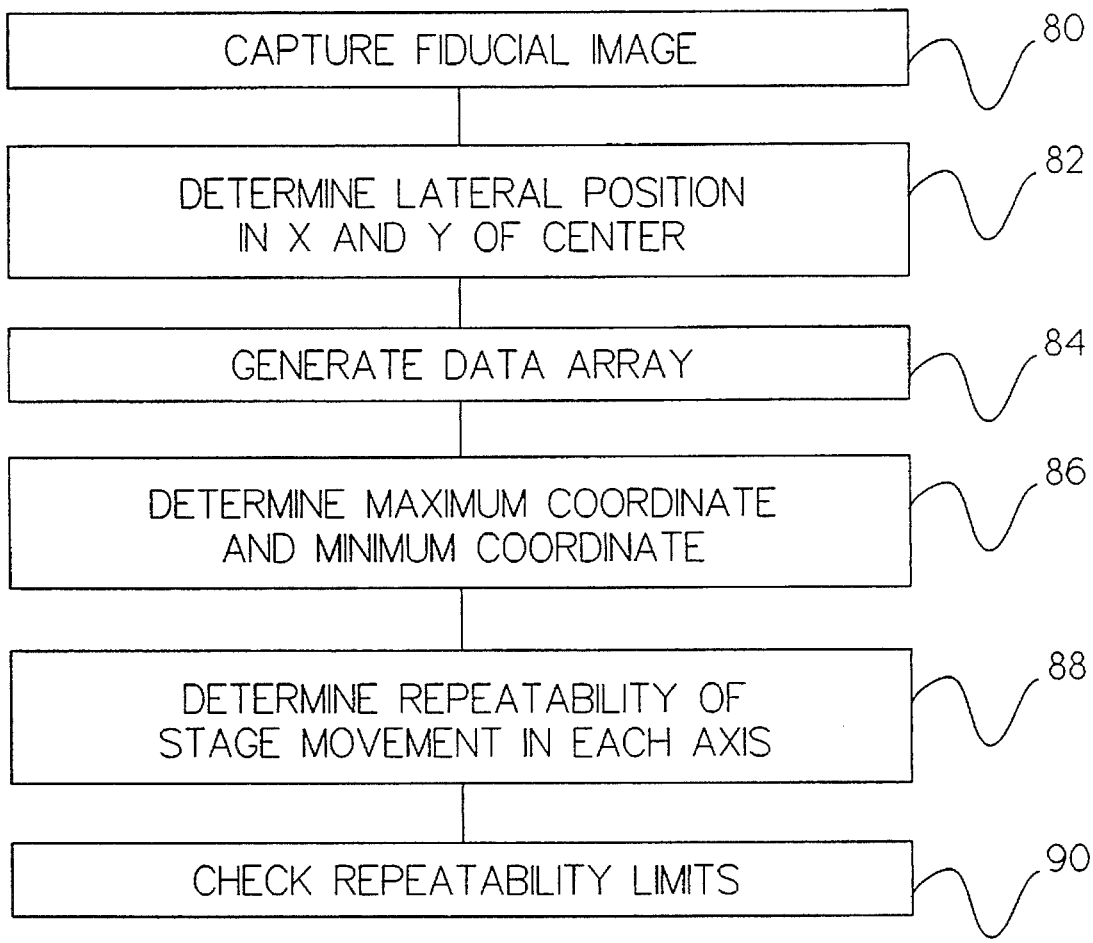

Referring now to FIGS. 6A and 6B, a flow diagram of one method of the invention for checking stage movement repeatability is shown. At step 62 an objective lens of a first magnification power is selected. In one example, a 20×magnification is selected. At step 64 the calibration plate is inserted into the optical path as shown, for example, in FIG. 2, and the 0,0 fiducial, best shown in FIG. 3 is located and centered in the microscope's field of view at step 66. Generally, step 66 may comprise a number of process substeps for grossly positioning the stage in the vicinity of the 0,0 fiducial as shown at substep 70, performing a focus pan at substep 72, determining the location of the center of the fiducial with respect to the optical axis (or camera center) at substep 74 and translating the stage in the X and Y plane to center the fiducial in the field of view at substep 76.

In one example of the invention, a focus pan 72 may comprise the steps of moving the stage in the Z direction to an estimated focus position followed by incrementally moving towards a position of best focus while acquiring images at each position. The images acquired during the focus pan are processed for focus features, such as high frequency content. The stage continues to move incrementally until the position of best focus has been passed, that is the focus features cease to improve. The stage is then returned to the position of best focus. Other methods are known by those skilled in the art to perform a focus pan.

At step 68, the location of the fiducial center is recorded. At step 78 the stage is moved in a star like pattern first in a direction away from the center of the field of view, then in a direction returning the fiducial to the center of the field of view.

Figure 5:
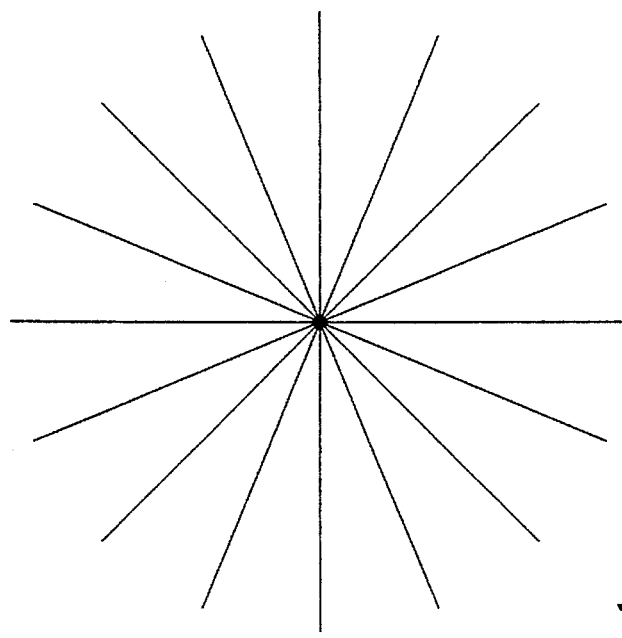
FIG. 5 shows an example of a scan pattern of a point on the XY stage used by one method of the invention.

In one example, the stage is automatically moved so as to move the fiducial away from and then back to the center of the field of view on a 1.5 mm radius in 15 degree increments for twenty four repetitions. The motion profile appears to be a star like pattern as shown in FIG. 5.

The basic premise of the method of the invention is to move the fiducial so as to approach a predetermined position from multiple directions to determine the multidirectional repeatability of the system. The process continues with step 80 where, each time the stage returns to the central position, the fiducial image is captured by the camera. At step 80 the fiducial image is captured by the camera and the coordinates of the fiducial image are recorded. The recorded coordinate information is used to determine the lateral position in the X and Y plane of the center of the fiducial with respect to the optic axis at step 82. In addition, at step 84, the Z position of the image is also determined using the focus apparatus described in a co-pending patent application entitled METHOD AND APPARATUS FOR RAPID CAPTURE OF FOCUSED MICROSCOPIC IMAGES as described below with reference to FIGS. 10–19. A difference in Z position from iteration to iteration represents a cross coupling of motion into the Z axis from an X-Y move. At step 84 a data array is generated comprising the X, Y and Z coordinate for each iteration of the test. The array is read to determine the maximum and minimum coordinate in each of the X, Y and Z axes for each of the incremental movements following the star like pattern. The absolute value of the difference between each of the corresponding maximum and minimum coordinates is used to determine the repeatability of stage movement in each axis.

The method of the invention is superior to linear encoders or interferometric methods because repeatability is determined exactly at the point of interest. Other methods infer position based on a device that is remotely located from the point of interest. In addition the method of the invention allows a quick check of stage performance between processing operations performed by the machine being tested with no special instrumentation needed. Table 1 shows the output of the test including the limits for test parameters.

TABLE 1

| X/Y Repeatability and Z Cross Coupling Test | | |
|---|---|---|
| Parameter | Result | Limit |
| X repeatability: | 3299 | <15000 nm |
| Y repeatability: | 2200 | <15000 nm |
| Z cross coupling | 111 | <2000 nm |

Z Repeatability Test

Figure 7A:
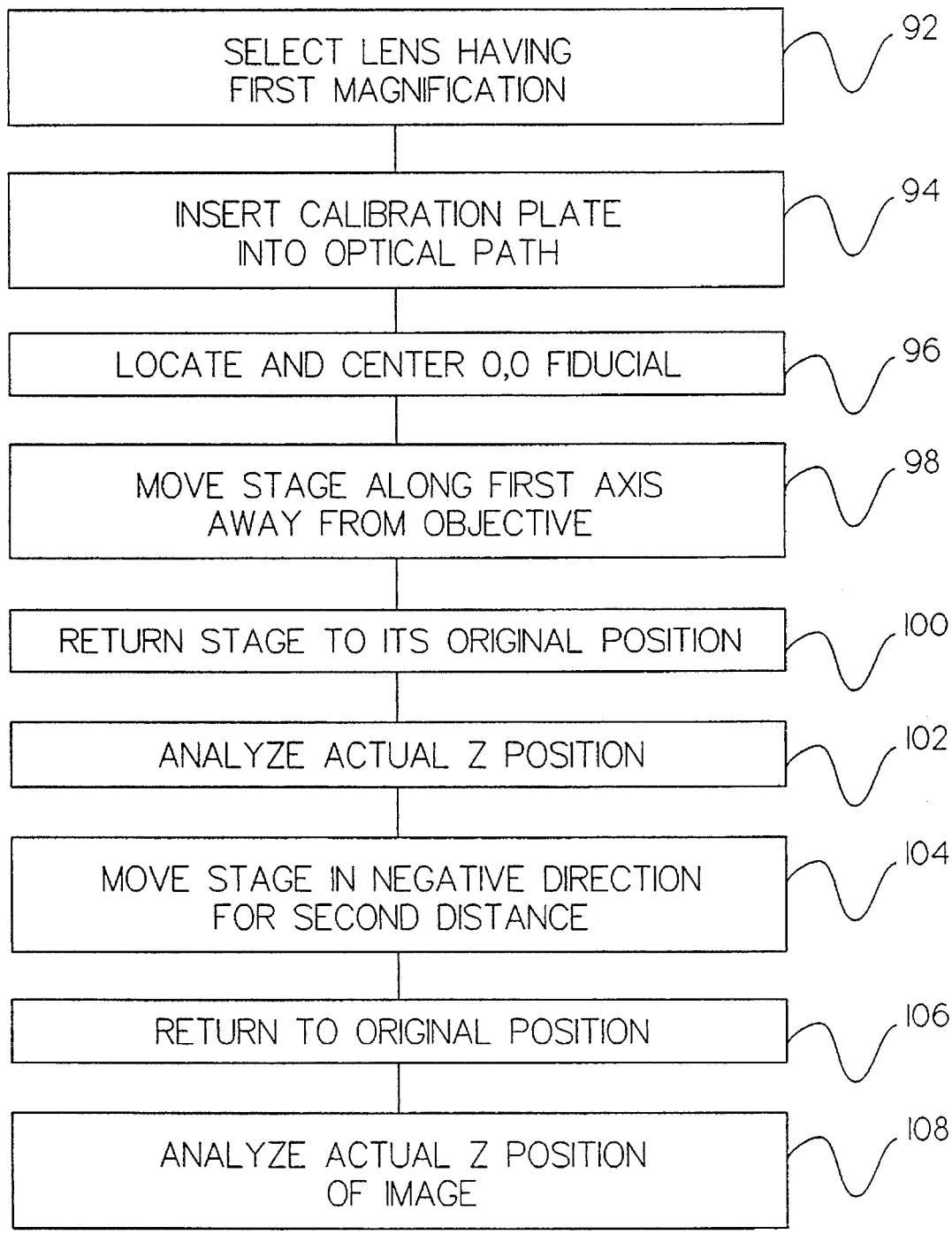
FIGS. 7A and 7B show a flow diagram of one method of the invention for checking repeatability of movement along a Z axis.
Figure 7B:
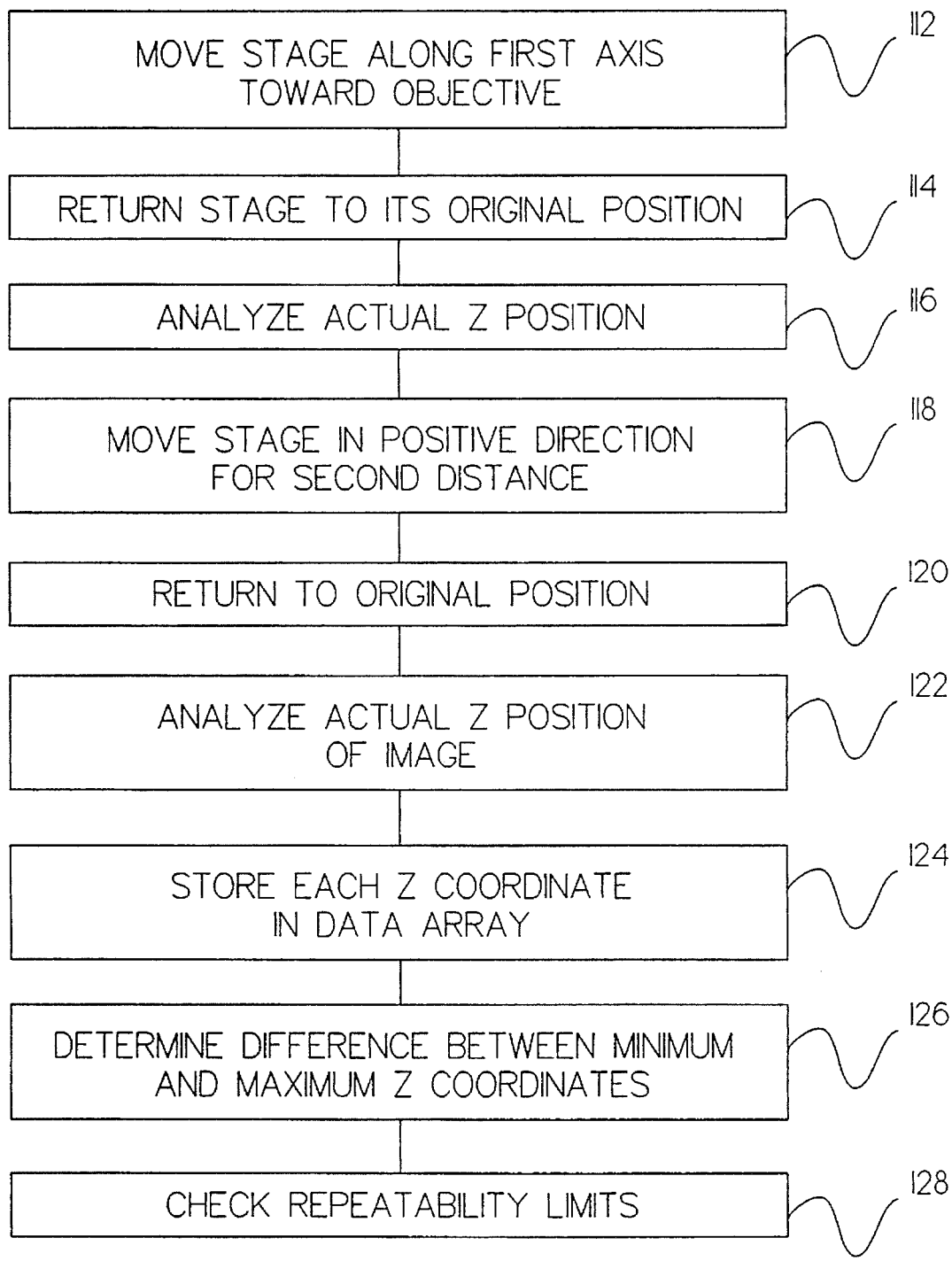

Refer now to FIGS. 7A and 7B where a flow diagram of one method of the invention for checking repeatability of movement along a Z axis is shown. Repeatability in Z influences the speed of processing of an automated microscopy instrument. This is due to the manner in which the instrument collects images for processing. When an image does not have suitable focus for processing, a projection of best focus is made and the image is returned to the queue to be collected later. When the system returns to that image the focus projection is applied. If the stage has poor repeatability of movement along the Z axis relative to the focus error budget, the system may move to the incorrect position, thereby requiring numerous iterations developing a new focus projection, replacing the image back into the queue and reattempting to correctly position the image to finally attain acceptable focus. This increases the time to process the slide. The Z repeatability test as run in accordance with the present invention characterizes this error.

Process steps 92, 94 and 96 set up the test and are similar to those as above described above with reference to FIG. 6A with respect to process steps 62,64 and 66 respectively. As above, in one example an objective lens having a 20× magnification is selected and a fiducial 0,0 is focused and centered in the field of view to establish an origin. At step 98 the stage is moved in a negative direction, where a negative direction is considered to be a direction away from the microscope objective. In one useful example, the stage is moved along the Z axis a first distance of about 10 microns. At step 100 the stage is returned to the origin. After returning, the actual Z position is analyzed at step 100 using the autofocus method and apparatus as described herein. At step 104 the stage moved in a negative direction equal to a second distance. In the example described herein the second distance may be about 100 microns. As before, at step 106 the stage returns to the origin. The image is again processed for Z position at step 108.

The process is repeated again in the positive Z direction beginning at step 112 where the stage is moved along the Z axis in a positive direction (that is, toward the microscope objective) a third distance. At step 114 the stage is returned to origin and the actual position of the fiducial along the Z axis is measured at step 116. At step 118 the stage is moved in a positive direction for a fourth distance. At step 120 the stage is returned to the origin. After returning, the actual Z position is again analyzed at step 122 using the autofocus method and apparatus as described herein.

Then the process is repeated again in both directions, each time the Z coordinate is stored at step 124. The multiple distance moves are incorporated to ensure the repeatability in move length independent. After all iterations have been completed, the data array is processed to determine the difference between the minimum and maximum Z coordinate. An absolute value of the difference is taken as the repeatability of the Z stage. Some results of this test have been generated for the NeoPath system and are shown in Table 2.

TABLE 2

| Z Repeatability | | |
|---|---|---|
| Parameter | Result | Limit |
| Z repeatability: | 149 | <2000 nm |

Turret Repeatability Test

Figure 8:
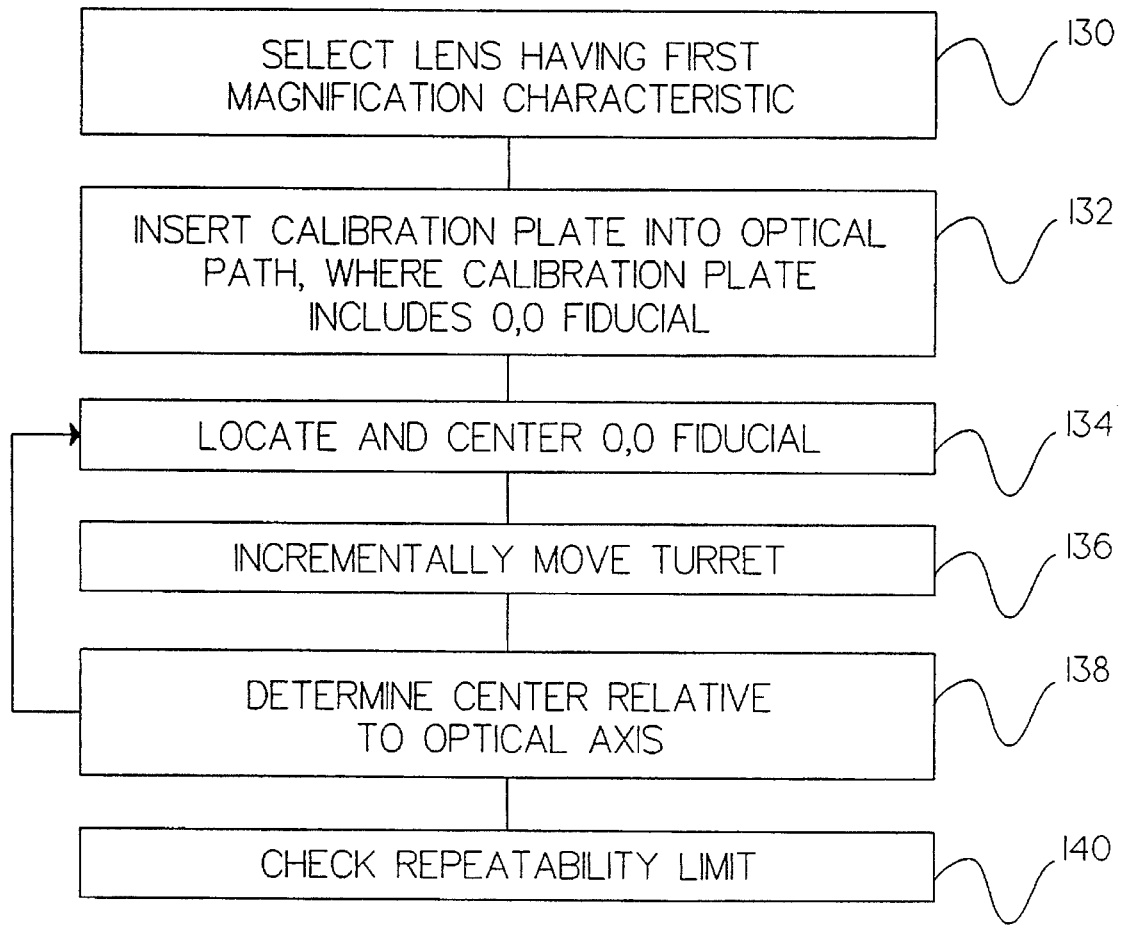
FIG. 8 showing a flow diagram of one method of the invention for checking repeatability of turret movement.

Refer now to FIG. 8 showing a flow diagram of one method of the invention for checking repeatability of turret movement. In a similar fashion to the checks for stage repeatability in the X,Y plane, turret movement repeatability may also affect the efficacy of an automated microscope based instrument. Therefore, the invention provides a turret repeatability test. The system is set up as before. In this case however, the XY and Z stage remains stationary and the turret 22 is moved out of and back into position. The turret positioning movement is repeated six times, each time alternating between clockwise and counter clockwise directions. As described above, at step 130 an objective lens of a selected magnification characteristic is used. At step 132 a calibration plate is inserted into the optical path and, at step 134, each time the turret is moved back into position, an image of fiducial 0,0 is acquired. The image is processed at step 138 to determine the center in the X, Y plane relative to the optical axis of the microscope. In one example, a 6×2 array is developed of X and Y coordinates for each of the six iterations. The maximum and minimum extent are determined for each axis. An absolute value of the largest difference is taken as the turret repeatability. The results are shown in Table 3.

TABLE 3

| Turret Repeatability | | |
|---|---|---|
| Parameter | Result | Limit |
| Turret repeatability: | 1650 | <7000 nm |

Objective Centration and Parfocality Test

Figure 9:
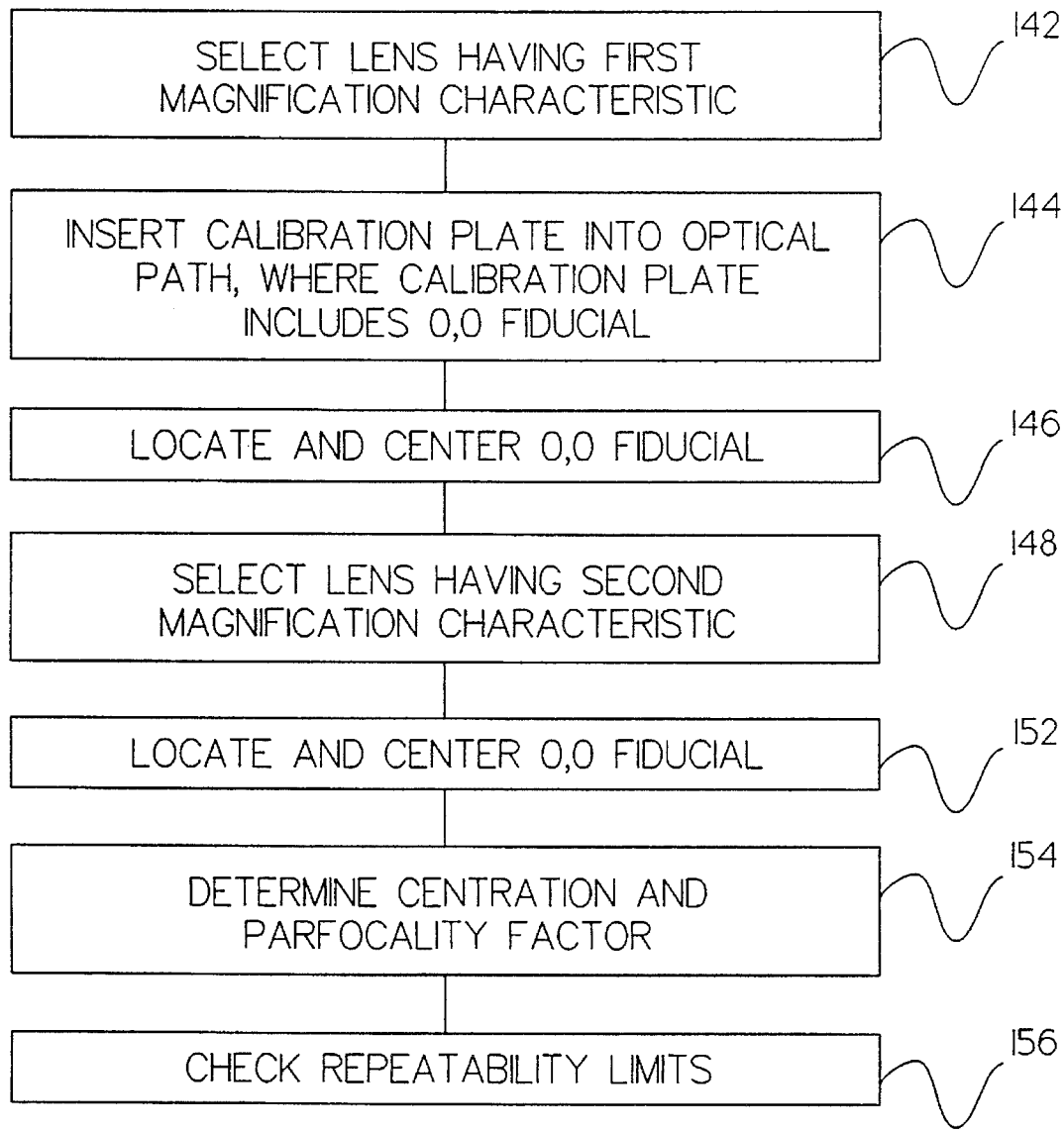
FIG. 9 shows a flow diagram of one method of the invention for checking objective centration and parfocality.

Refer now to FIG. 9 where a flow diagram of one method of the invention for checking objective centration and par-focality is shown. Multiple objectives are typically used in an automated microscope based instrument to vary the magnification. Each objective has its own optical axis, that is to say each objective looks at a certain area of the specimen. It is necessary to make these optic axes collinear such that the center of the image in one objective is very close to the center of another objective when it is placed in position. In addition, it is advantageous to make the focal planes coplanar. A test is performed to ensure that the optic axes of each objective are collinear and the focal planes are coplanar.

Process steps 142, 144 and 146 set up the test and are similar to those as above described above with reference to FIG. 6A with respect to process steps 62, 64 and 66 respectively. As above, in one example an objective lens having a 20× magnification is selected and a fiducial 0,0 is focused and centered in the field of view to establish an origin. At step 148, a second objective is selected having a second magnification characteristic. In one example, the system is reconfigured to the 4× magnification and the center of the fiducial is found and focused. At step 152, the 0,0 fiducial is again located and centered. The X, Y and Z coordinates are compared to those of the first selected objective. The X and Y difference is taken as the centration of the objectives and the Z difference is taken as the parfocality at step 154. The results are compared against limits as seen in Table 4.

TABLE 4

| Centration and Parfocality | | |
|---|---|---|
| Parameter | Result | Limit |
| Centration 4X to 20X | 4400 | <25000 nm |
| Parfocality 4X to 20X | 750 | <15000 nm |

In order to promote further understanding of the invention, one example of a method employed by the invention for focussing will now be further described. As described above with reference to FIGS. 1A, 1B and FIG. 2, the motion controller 504 includes a stage for receiving the slide 1 and is responsive to a slide scan signal, received from a processor 540, for moving the stage in a slide plane represented by X and Y directions. In the illustrative diagram of FIGS. 1A, 1B and FIG. 2, the X and Y directions are located in the plane that is perpendicular to an optical path intermediate the slide 1 and the condenser 402. The motion controller 504 is further responsive to a slide focus signal for moving the slide 1 in a direction normal to the slide plane, along the optical path 110, for focusing the camera upon the slide 1. The motion controller 504 is constructed to provide a position signal to the processor 540 wherein the position signal is indicative of the X, Y, and Z position of the slide 1. Motion controllers for performing the above-described functions are known in the art and a suitable motion controller may be selected by those skilled in the art.

The camera assembly 512 is constructed to provide an image signal indicative of the optical transmissivity of the specimen on the slide 1. The image signal from the camera assembly 512 is obtained by focusing the camera assembly 512 on a focal point positioned a first distance along the optical path 110. The camera assembly 512 is further constructed to provide an above focus image signal and a below focus image signal, referred to herein as a focus plus and a focus minus signal, respectively. The focus plus signal is provided by focusing the camera assembly on a focal point positioned a second distance along the optical path 110 wherein the length of the second distance is greater than the length of the first distance. The focus minus signal is provided by focusing the camera assembly on a focal point positioned a third distance along the optical path 110 wherein the length of the third distance is less than the length of the first distance. The image signal, focus plus signal, and focus minus signal are each provided to the processor 540.

The processor 540 uses the focus plus signal and the focus minus signal to determine the positioning of the slide 1 along the optical path 110 necessary for focusing the specimen so that the image signal provided by the camera 512 will be in focus. More particularly, the processor 540 determines whether the received signal is of a magnitude large enough to focus, whether the image plane lies within the correctable region, and which direction to move the slide 1 to focus the image.

Figure 10:
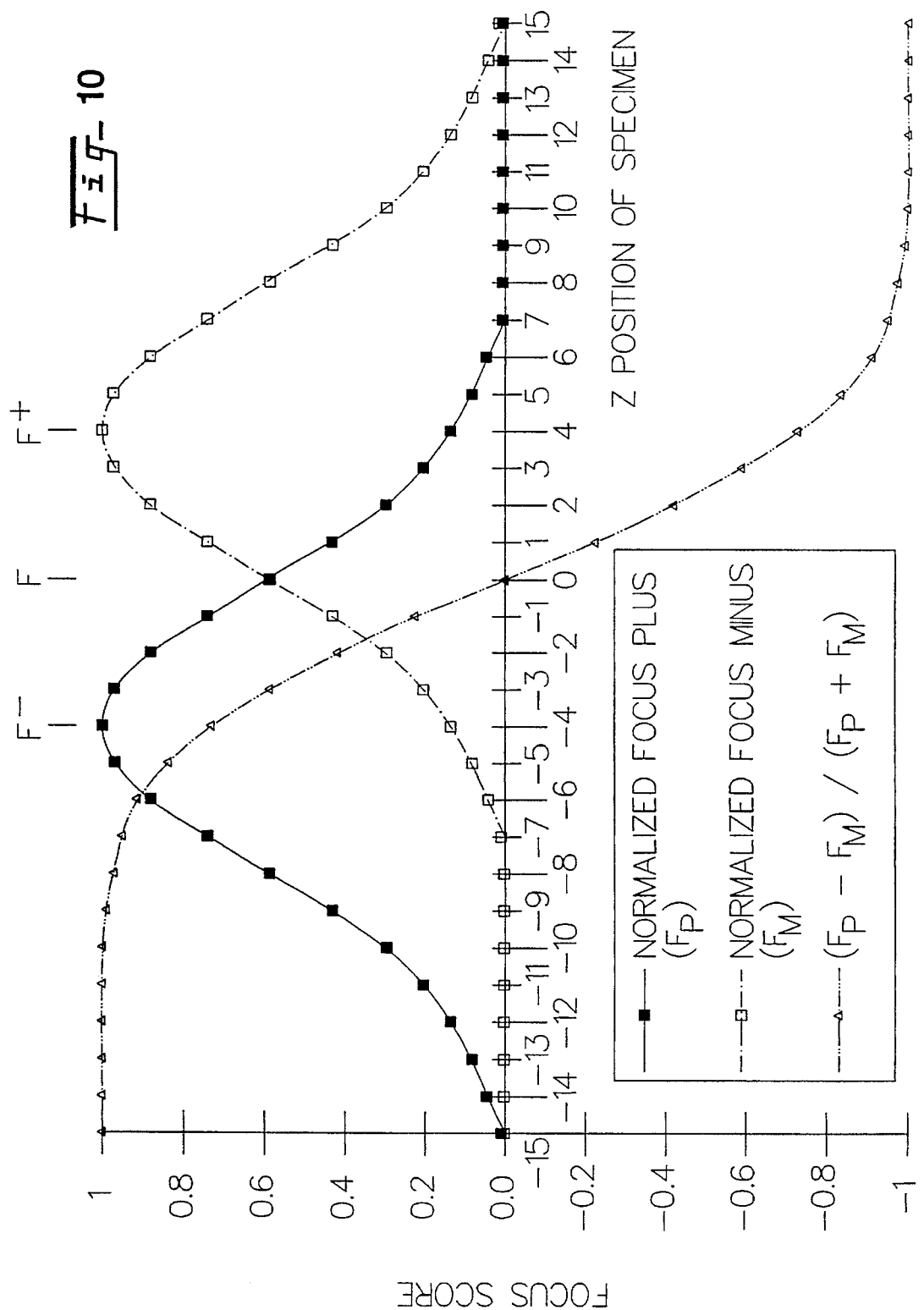
FIG. 10 is a graph illustrating the relationship between the passband frequency component of the signal provided by the camera assembly of FIG. 1A and the focus of the camera assembly.

Generally, the processor 540 determines the magnitude of the band-pass frequency energy in the focus plus and focus minus signals. As illustrated in FIG. 10, the image signal will be in focus when the band-pass frequency energy of the focus plus and focus minus signals are substantially equal. Accordingly, to determine the proper positioning of the slide 1 along the optical path, the processor 540 need only determine how far the slide must be displaced for the energy provided by the focus plus and focus minus signals to be substantially equal. It will be apparent to those skilled in the art that the relative positioning of the focal point of the camera assembly when providing the focus plus signal and focus minus signal is determinative of the relationship between their band-pass frequency energy components and the positioning of the camera assembly for providing a focused image signal.

So that the image signals may be obtained more rapidly, the processor 540 is constructed to provide the scan signal to position the motion controller 504 in a plurality of X-Y positions to obtain a plurality of image signals indicative of a respective plurality of images of a portion of the specimen on the slide 1. The processor 540 may be further constructed to determine the proper positioning of the slide 1 along the optical path for each of the plurality of image signals obtained. After each of the plurality of image signals has been obtained, the processor 540 can determine whether the slide is focused by examining the band-pass frequency component of the focus plus signal and the focus minus signal, as discussed above. If the image signals were not focused, the processor 540 will determine the proper positioning of the slide for focus and will provide the scan signal to the motion controller 504 to re-position the slide 1 in the X-Y positions of the portions not focused and, simultaneously, provide the slide focus signal to the motion controller 504 to obtain the proper positioning of the slide 1 along the optical path so that focused image signals are obtained.

Figure 11:
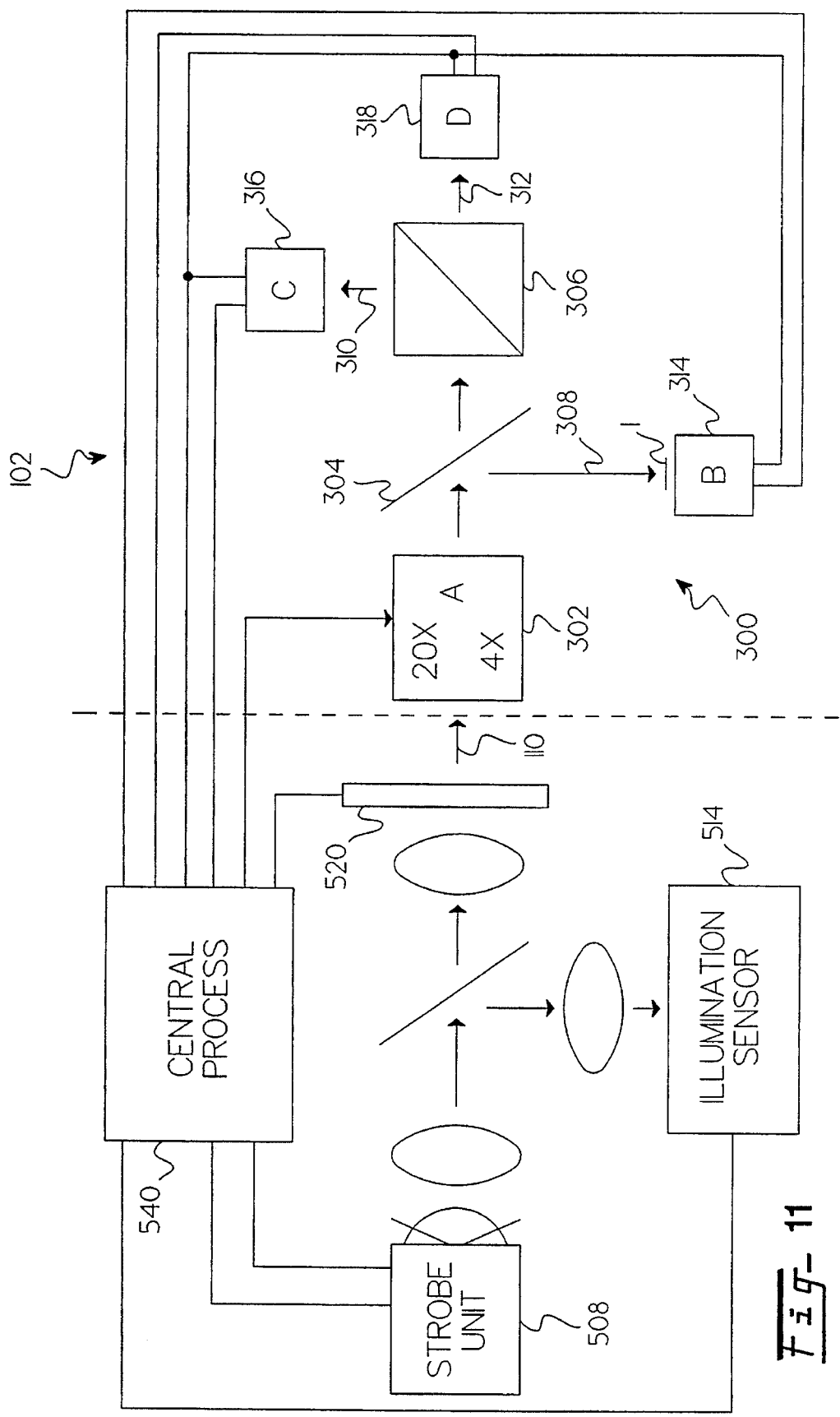
FIG. 11 is a more detailed illustrative diagram of the camera assembly that comprises the subject invention.

A more detailed diagram of the camera assembly 512 is provided in the illustrative diagram of FIG. 11. Therein, an optical transmission assembly 300 includes an objective lens assembly 302, a first beam splitter 304 and a second beam splitter 306. The first and second beam splitters 304 and 306 provide first, second, and third optical paths 308, 310, and 312, respectively. The objective lens assembly 302 is constructed to vary the magnification provided to the specimen on the slide 1. In a presently preferred embodiment of the invention, the objective lens assembly 302 is responsive to a magnification signal received from the processor 540 to select various lenses to vary the magnification. Suitable assemblies for responding to an electric signal to move two or more lenses into and out of position for varying the magnification provided to the specimen may readily be provided by those skilled in the art.

A primary camera 314 is positioned to receive a first image of the specimen on the slide 1 via the first optical path 308. The first optical path 308 is the path from point A on the objective 302 to point B at the CCD of the primary camera 314. The primary camera 314 is responsive to an activation signal for providing an image signal representing the first image. A focus plus camera 316 is positioned to receive a second image of the specimen on the slide 1 along a second optical path 310. The second optical path 310 is the path from point A on the objective 302 to point C on the CCD of the focus plus camera 316. The length of the second optical path 310 is less than the length of the first optical path 308 by a predetermined length. The focus plus camera 316 is also responsive to the activation signal for providing a focus plus signal, wherein the focus plus signal is indicative of the focus of the image signal. A focus minus camera 318 is positioned to receive a third image of the object on the slide 1 via a third optical path 312. The third optical path is the path from point A on the objective 302 to a point D on the CCD of the focus minus camera 318. The length of the third optical path 312 is greater than the length of the first optical path 308 by the predetermined length. The focus minus camera 318 is responsive to the activation signal for providing a focus minus signal that is also indicative of the focus of the image signal.

Figure 12:
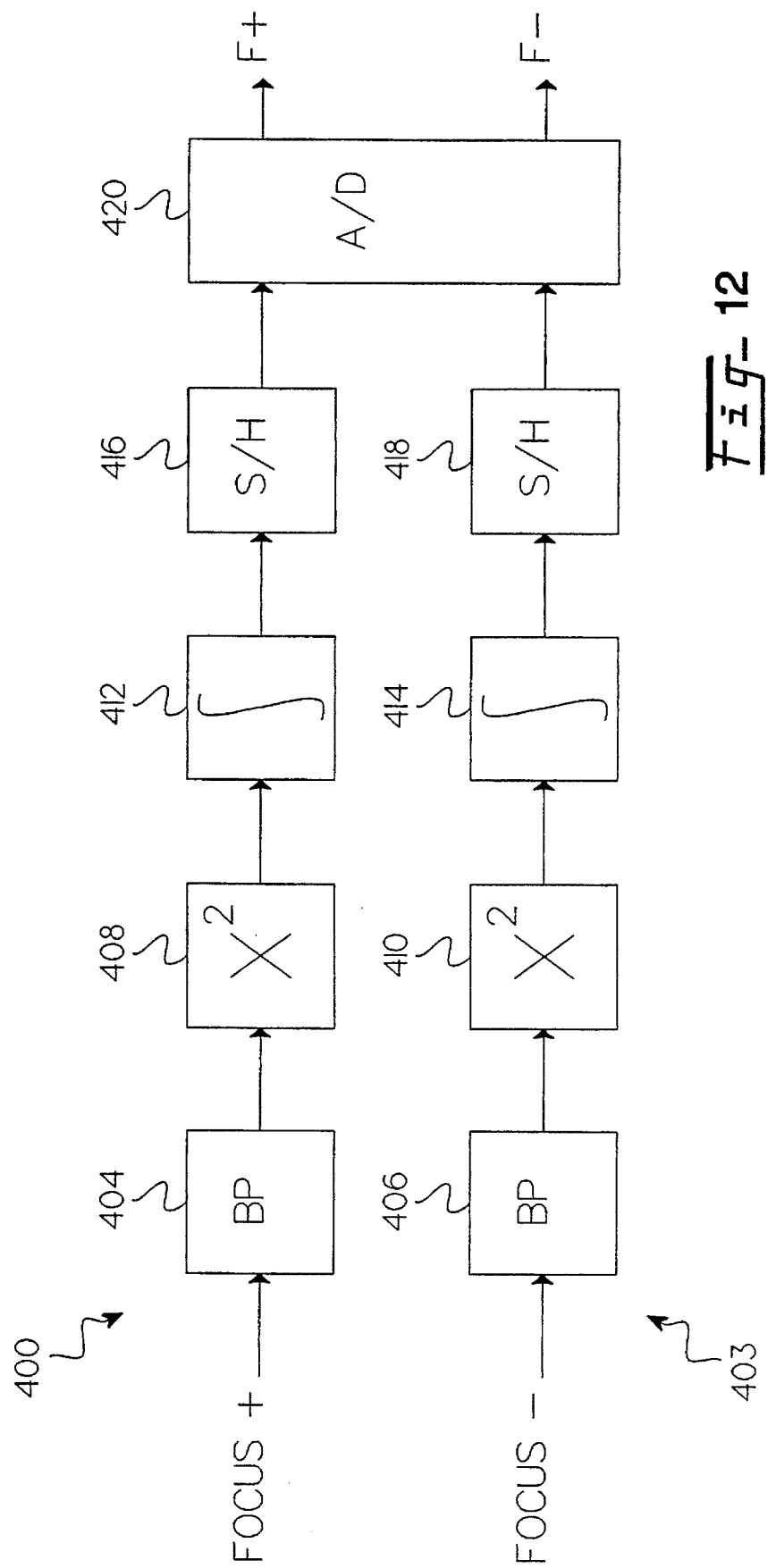
FIG. 12 is an illustrative diagram of a circuit for determining the focus position of the camera assembly of FIG. 11.

As discussed above, the processor 540 determines the band-pass energy of the focus plus signal and the focus minus signal to determine the proper positioning of the slide 1 so that the image signals will be representative of a focused image of the specimen on the slide. Accordingly, the processor 540 includes first and second identical focus processor circuits 400 and 403, as illustrated in FIG. 12. The focus processor circuits 400 and 403 each include a band pass filter 404 and 406, respectively, for receiving the focus plus and focus minus signals. The band pass filters 404 and 406 are constructed to pass a band-pass energy component of the focus plus and focus minus signals. Each filtered signal is multiplied by itself in respective multiplier circuits 408 and 410 so that the resulting signal is always proportional to the magnitude of the energy. This energy level signal is then integrated for each line of active video provided in respective integrators 412 and 414 to provide signals indicative of the total energy provided in the bandpass. The output from integrators 412 and 414 is sampled by respective sample and hold circuits 416 and 418 before being digitized by an analog-to-digital convertor 420. The processor 540 uses the signals from the analog-to-digital convertor 420 to determine the proper positioning of the slide 1 so that the image signals provided by the primary camera 314 will be representative of a focused image.

In operation, the processor 540 receives an array of focus plus scores FP(0), FP(1), . . . FP(255), and array of focus minus scores FM(0), FM(1), . . . FM(225), each including 256 elements, one for each line of a particular field of the camera 512. The focus plus and focus minus arrays provide video signals to the focus processor which are used to calculate the focus score. Only the first field of the interlaced video image is used to calculate the focus score so that the acceptability of the image may be determined while the second field is still being received from the camera. In this manner, the focus score is available before the entire image is received. Each line of the image is processed through bandpass filters and the energy is integrated and measured by the analog-to-digital converters.

Figure 13:
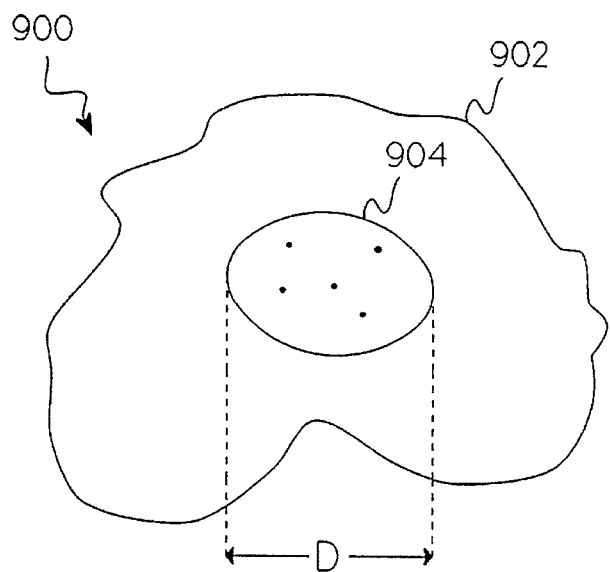
FIG. 13 shows a schematic view of a typical cell.

In order to further understand the filter selection process of the invention, refer to FIG. 13 where a schematic view of a typical cell is shown. A cell 900 comprises cell cytoplasm 902 and a cell nucleus 904. Typical cell nuclear sizes for pap smears range in area from about 40 micrometers squared to 220 micrometers squared. Typical nuclear diameters range from about 4 micrometers to 10 micrometers. In one example embodiment of the invention where the magnification of interest is 20×, pixel size is 0.55 micrometers per pixel.

Figure 14:
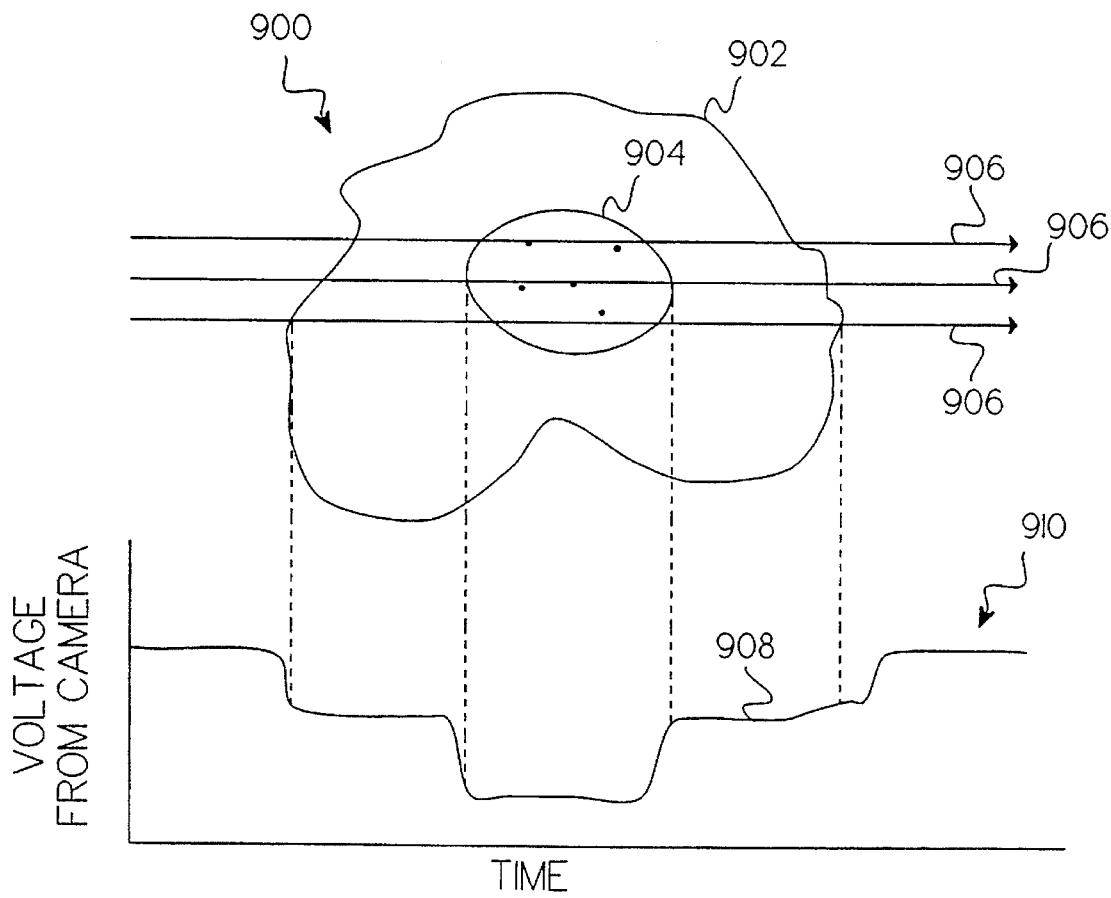
FIG. 14 shows a process for converting physical cell size into electrical band width.

Now referring to FIG. 14, a process for converting physical cell size into electrical band width is schematically illustrated. The conversion from physical size into electrical band width may be accomplished by using the known pixel clock rate from the camera. In this example, the pixel clock rate is $14.1875 \times 10^6$ pixels per second. From the pixel clock rate, the physical size of a cell nucleus may be translated into a time varying voltage when the camera images the cell nucleus. This technique is well known in the art. The pixel time in one example of the invention is about $70.5 \times 10^{-9}$ seconds. The target for the focus system is between 7 and 19 pixels in size. Because some spreading of the object size occurs due to defocused images being used as the stimulus to the cameras for measuring focus, the size range is increased slightly. The focus system may advantageously be made sensitive to objects having a size of from 7 to 22 pixels. A nucleus sectioned by a video camera scan line 906 has a time varying modulation 908 in the electrical domain, which correlates to its size in the spatial domain. The relationship between the spatial domain and electrical domain is illustrated in FIG. 14 which shows the cell 900 having its nucleus 904 scanned by video lines 906. The scanned cell is then translated into electrical voltages as indicated by plot 910 which plots a modulated voltage signal 908 against time.

Figure 15:
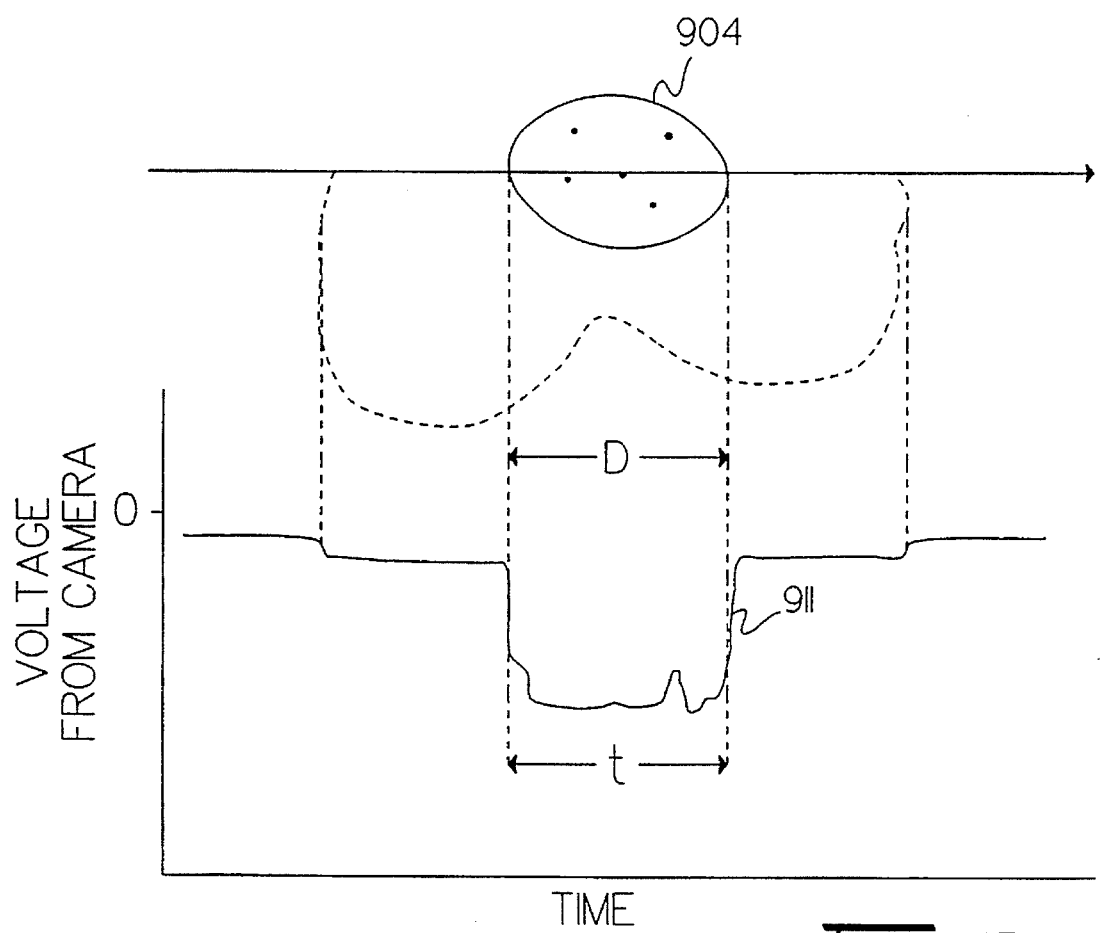
FIG. 15 graphically illustrates a time vary voltage of a dark nucleus.
Figure 16:
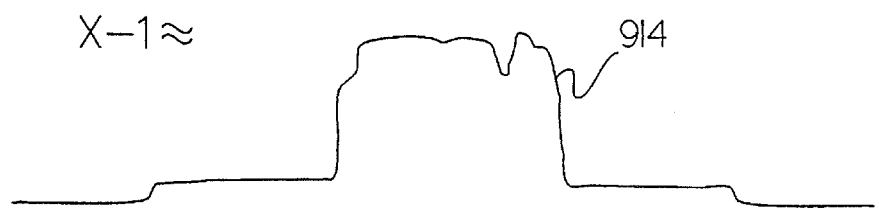
FIG. 16 shows an inverted pulse representing a square function.

Referring now to FIG. 15, a time vary voltage of a dark nucleus is graphically illustrated. The nucleus 904 is analogous to a pulse or square function 912 having an interval,t. In this example, shown for illustrative purposes and not by way of limitation of the invention, the interval t may range from about $493 \times 10^{-9}$ to $1550 \times 10^{-9}$ seconds. FIG. 16 shows an inverted pulse 914 which is inversely related to pulse 911. Fourier transformations for such square functions are well known.

Figure 17:
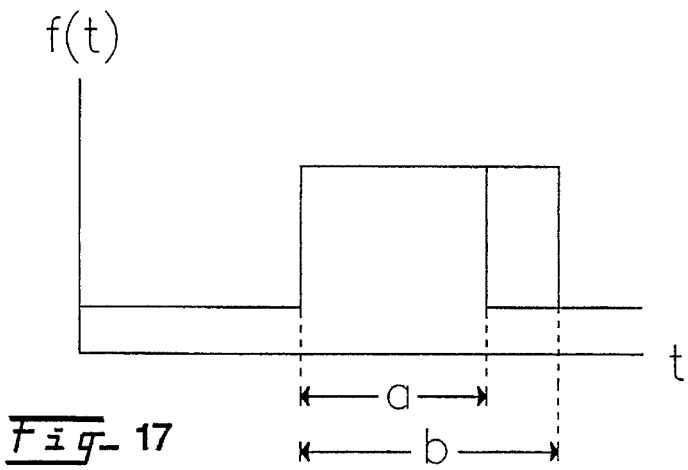
FIGS. 17 and 18 show a Fourier transformation for a square function as employed in one aspect of the invention.
Figure 18:
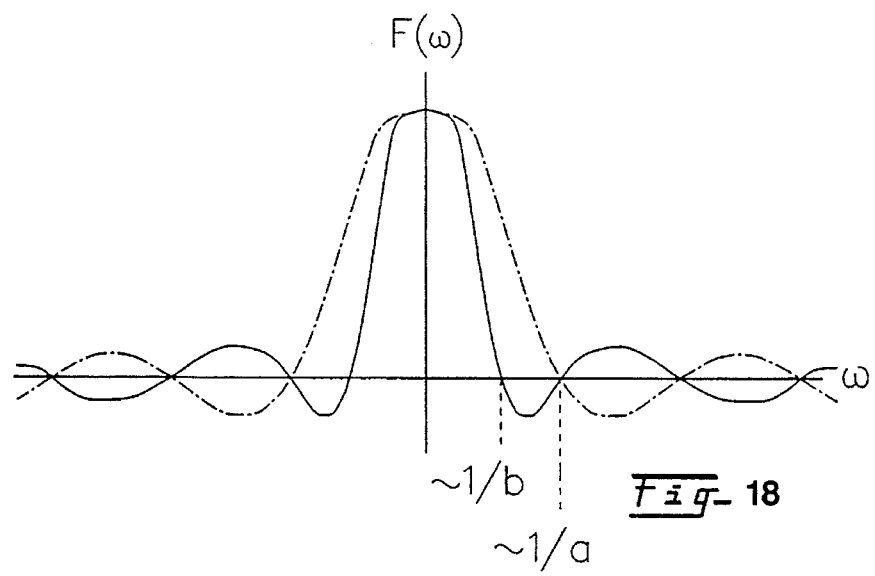

Referring now jointly to FIGS. 17 and 18, a Fourier transformation for a square function is illustrated as employed in one aspect of the invention. Where a is the smallest nucleus and b is the biggest nucleus, the focus transformation of such pulses then represent spectral energy of objects of the particular size of interest. Using the Fourier representation of these objects, a spectral filter may be chosen which is sensitive to objects in this size range.

Figure 19:
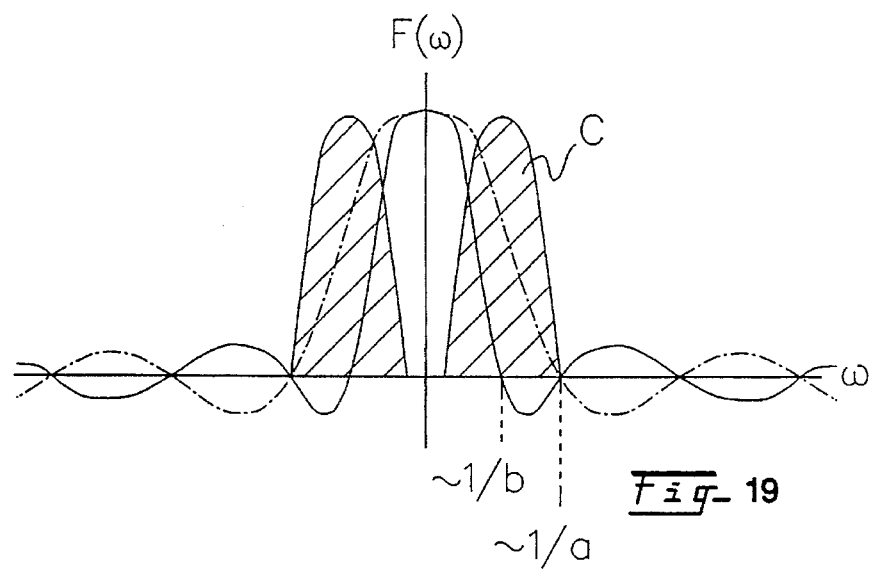
FIG. 19 illustrates a filter response sensitive to objects of interest, such as cell nuclei as employed in one embodiment of the invention.

Referring now to FIG. 19, filter response sensitive to objects of interest, such as cell nuclei, is schematically illustrated. Filter response C may be selected so that the focus system is sensitive to cell nuclei in the size range of interest. Once having the benefit of knowing the filter response desired for objects in the range of interest as taught by the present invention, a band pass filter may then be designed using conventional techniques.

Next, a filter operation is performed on each of the four arrays FP, FM, FPnoise, and FMnoise in order to reduce sensitivity to objects that are smaller than the desired cells that are to be focused on. The filter operation is sensitive to the vertical size of objects, whereas the band pass filter on the video lines are sensitive to the horizontal size of objects. Accordingly, the system is sensitive to the two dimensional size of objects in the focus system. This provides an improved focus and improves signal-to-noise ratio.

The filter operation can be expressed as follows:

| [FP(0) . . . FP(255)] | * [Ffk(0) . . . Ffk(4)] ⇒ |
|---|---|
| [XFPS(2) . . . XFPS(253)] | |
| [FM(0) . . . FM(255)] | * [Ffk(0) . . . Ffk(4)] ⇒ |
| [XFMS(2) . . . XFMS(253)] | |

The focus plus and focus minus array are each convolved with a filter array Ffk to correlate the energies of adjacent lines. The filter array Ffk is selected to provide a low pass filter that looks for objects at least five lines in size. The filter array Ffk is selected to provide a finite impulse response, low pass filtering of the focus plus and focus minus arrays. The filter kernel is designed to be sensitive to the size and type of object that the processor 540 is attempting to detect. Further, the finite impulse response filtering is performed in a manner so that the resulting filter array eliminates the first and last few elements of the respective focus plus and focus minus array to eliminate edge effects from the filter.

After filtering the focus plus and focus minus arrays, filtered focus plus and focus minus arrays, XFPS and XFMS, respectively, are created with each array including 252 elements. The filtered focus scores are further combined with a noise array to eliminate noise that may be provided by the camera system 512. More particularly, the camera system 512 may include noise that results from camera noise, integrator leakage, dust or streaks on the focus camera, or in one of the optical image planes. To eliminate this noise, a noise array is generated and combined with the filtered focus scores. The noise array is generated by focusing the camera 512 upon a white field, i.e., one with no slide 1 so that the focus plus and focus minus camera can measure the fixed noise floor energy within the focus filter band pass. The blank image is viewed in order to obtain a measure of the fixed noise patterns that will stimulate the focus processor. The noise arrays of raw focus scores obtained from viewing the blank image are represented as: [FPnoise(0) . . . FPnoise(255)] for the focus plus array; and, [FMnoise(0) . . . FMnoise(255)] for the focus minus array. The noise floor integration is relatively consistent and can be measured and subtracted from the energy measurements made for the individual line scores. This significantly improves the signal to noise ratio for each line.

In this regard, a noise plus and noise minus array is measured for the focus plus and focus minus cameras 316, 318 in the same manner as the focus plus and focus minus signals, discussed above. The noise plus and noise minus arrays include an element for each line of the focus plus and focus minus arrays, respectively. The noise plus and noise minus arrays are convolved with the filter array Ffk, as discussed above with the focus plus and focus minus arrays, to provide filtered noise plus and filtered noise minus arrays, FPNX and FMNX, respectively. The resulting arrays are filtered noise plus and filtered noise minus arrays, having a one-to-one correspondence with the focus plus and focus minus arrays, respectively. The filter operation on the noise arrays are expressed as follows:

| [FPnoise(0) . . . FPnoise(255)] | * [Ffk(0) . . . Ffk(4)] ⇒ |
|---|---|
| [FPNX(2) . . . FPNX(253)] | |
| [FMnoise(0) . . . FMnoise(255)] | * [Ffk(0) . . . Ffk(4)] ⇒ |
| [FMNX(2) . . . FMNX(253)] | |

The filter operations are a convolution, shown in the above equations by the asterisk symbol. The 2 elements on each end of the filtered arrays are excluded since the convolution operation is not defined for the elements on each end of the array. The filtered noise plus and noise minus arrays, FPNX and FMNX are correspondingly subtracted from the filtered focus plus and focus minus arrays, XFPS and XFMS, to provide respective focus plus and focus minus signal arrays, FPS and FMS. This improves the S/N ratio. The noise value can be as much as 10%–50% of the total signal. Since the noise is static and repeatable, it can be removed with this method. The noise reduced arrays are as follows:

[XFPS(2) ... XFPS(253)]–[FPNX(2) ... FPNX(253)]=FPS [(2) . . . (253)]

[XFMS(2) ... XFMS(253)]–[FMNX(2) ... FMNX(253)]=FMS [(2) ... (253)]

The individual elements of the focus plus signal and the focus minus signal arrays are now combined to provide an array of focus scores FS. Now, lines 2 through 253 have scores which are noise reduced and related to the two dimensional characteristics of above and below focus images. Each line from the above and below cameras represents a measure (in 2D) of the image frequency content. An array of focus scores can now be calculated as follows:

$$FS[(2) \dots (253)] = \frac{FPS[( ) \dots ( )] - FPM[( ) \dots ( )]}{FPS[( ) \dots ( )] + FPM[( ) \dots ( )]}$$

This step produces a normalized focus score for each line of the camera 512, except the first and last few lines that were excluded because of edge filter effects, as discussed above. Normalization of the focus scores helps to make the data independent, i.e., tends to make each score comparable to one another regardless of the amount of data used to produce the score. This operation normalizes the focus scores to values somewhere between −1 and +1, to create a spatially distributed set of focus scores.

After the focus plus signal array and focus minus signal array have been combined as discussed above to produce an array of focus scores, the array of focus scores is screened to eliminate those scores for which insufficient data existed to achieve a meaningful score. This is done by eliminating each score FS(x) for which FPS(x) plus FMS(x) is outside the range of a predetermined threshold. The threshold range is selected empirically by the lowest signal content image of interest. In a preferred embodiment of the invention, the range is selected to be between 3 and 240. Those skilled in the art will appreciate, however, that this range is only illustrative and that any range, including the full range, may be selected. In one embodiment, favorable results may be obtained using between 1% and 95% of the range. The FS values that qualify are then averaged to yield a single focus score evaluation for the image. This single focus score is a number between −1 and +1 which has a one-to-one correspondence with the distance necessary to move to put the image into best average focus.

In one aspect of the invention, a focus quality score, FQS(x), may be provided. The focus quality score comprises the average of FPS(x) plus FMS(x). The focus quality score indicates the signal level of the image and thereby provides a confidence level for the focus score. If the focus quality score is below a predetermined level, the focus score is not accepted as a reliable focus indicator.

After the focus score has been obtained a look up table is consulted for determining the distance and direction of movement along the optical path necessary to bring the object into focus. As noted above, a particularly novel aspect of the subject invention is the ability of the processor 540 to not only determine whether an image is in focus or out of focus, and not only determine the direction necessary to move the specimen to bring the image into focus, but to also determine the distance of motion necessary to bring the specimen into focus. By determining the exact displacement, and direction of displacement, necessary to bring the specimen into focus, the processor 540 may control the motion controller 504 to rapidly return to the position of any out of focus specimen and may provide the appropriate scan signal so that the motion controller will position the specimen to be in focus.

To determine the amount of displacement, a look up table comprising predetermined correction factors for a given set of optics is employed prior to obtaining any image signals. The correction factors may be derived empirically, for a each set of optics, using known methods. The correction factors in the look up table represent the distance necessary to move an object into focus. Since the focus scores relate to distance, the correction factors may be related to focus scores. When deriving the correction factors, a test image is employed and placed on the motion controller. In a presently preferred embodiment of the invention, a calibration to determine the displacement and direction correlation to focus scores is performed only once when the system is designed and remains the same so long as the component parts of the system are not disturbed. However, those skilled in the art will appreciate that the calibration to obtain data correlating the focus scores to the amount and direction of displacement may be performed at any time prior to obtaining image signals.

Using the above-described apparatus, focused image signals may be obtained in a very rapid manner. In a presently preferred embodiment of the invention, the motion controller 504 positions the slide 1 at a plurality of predetermined positions for obtaining image signals. After each image signal is obtained, the motion controller 504 immediately moves to obtain the next image signal. While the motion controller 504 is positioning the slide 1 to obtain the next image signal, the processor 540 determines whether the last obtained image signal was in focus. Accordingly, there is a 60 millisecond delay between the time that the image is taken and the time the image it is read out of the processor 540. If the last obtained image was in focus, processor 540 identifies the image signal as a focused image signal for use by the remainder of the system. However, if the image signal was not in focus, the processor 540 determines the displacement and direction necessary for focus of the specimen. Thereafter, the processor 540 instructs the motion controller 504 to return to the out of focus image and provides the necessary displacement information so that, when next obtained, the image will be in focus.

The invention has been described herein in considerable detail in order to comply with the Patent Statutes and to provide those skilled in the art with the information needed to apply the novel principles and to construct and use such specialized components as are required. However, it is to be understood that the invention can be carried out by specifically different equipment and devices, and that various modifications, both as to the equipment details and operating procedures, can be accomplished without departing from the scope of the invention itself.

What is claimed is:

1. An automated method for checking stage performance repeatability in an automated optical system having an automated microscope positioned to view an object on a stage along an optical path, where the optical path includes an optical axis therethrough, the automated method comprising the steps of:

(a) selecting a lens having a first magnification characteristic;

(b) inserting a calibration plate into the optical path, where the calibration plate includes a fiducial having a fiducial center, wherein the fiducial is located and centered in a field of view by
  i) grossly positioning the stage in a vicinity of the fiducial,
  ii) performing a focus pan,
  iii) determining a location of the fiducial center with respect to the optical axis,
  iv) translating the stage in an X, Y plane so as to center the fiducial at 0,0 in the field of view, where the X, Y plane is defined by a top surface of the stage;
  v) recording the location of the fiducial center; and
(c) incrementally moving the stage in a star pattern so as to repeatedly move the fiducial out of the optical axis and then back into line with the optical axis for a predetermined number of repetitions, where each time the stage returns the fiducial to an original position, an image of the fiducial is captured and processed so as to determine a lateral position in X and Y of the fiducial center with respect to the optical axis.

2. The automated method for checking stage performance repeatability as set forth in claim 1, where the step of incrementally moving the stage further comprises the steps of moving the stage a distance to identify a position repeatability characteristic.

3. The automated method for checking stage performance repeatability of claim 2 further comprising the steps of:
  i) determining a true Z position of the image by generating a data array containing an X, Y and Z coordinate for each iteration;
  a) processing the data array to determine a set comprising a maximum coordinate and minimum coordinate in each axis;
  b) calculating an absolute value of a difference taken between each set so as to determine repeatability of stage movement in each axis.

4. The automated method for checking stage performance repeatability of claim 3 further comprising the steps of:
  a) checking repeatability along an X axis to a limit of repeatability of less than 15000 nm;
  b) checking repeatability along a Y axis to a limit of repeatability of less than 15000 nm; and
  c) checking repeatability along a Z axis to a limit of repeatability of Z cross coupling of less than 2000 nm.

5. An automated method for checking stage performance repeatability in an automated optical system having an automated microscope positioned to view an object on a stage along an optical path, where the optical path includes an optical axis therethrough, and where the stage is initially positioned at an origin, the automated method comprising the steps of:
  a) selecting a lens having a first magnification characteristic;
  b) inserting a calibration plate into the optical path, where the calibration plate includes a fiducial and the fiducial is located and centered in a field of view;
  c) moving the stage along a Z axis, the Z axis being parallel to the optical axis of the lens, in a negative direction away from the lens a first distance;
  d) returning the stage to the origin;
  e) analyzing an actual Z position of an image;
  f) moving the stage is in a negative direction for a second distance and then returning to the origin;
  g) analyzing the actual Z position of the image;
  h) repeating steps b through g again in except reversing a direction of movement of the stage so that the stage is moved toward the lens;
  i) storing each Z coordinate in a data array; and
  j) processing the data array to determine a difference between a minimum and maximum Z coordinate where an absolute value of the difference is taken as a repeatability of the stage.

6. The automated method for checking stage performance repeatability of claim 5 further comprising the step of checking repeatability along the Z axis to a limit of repeatability of less than 2000 nm.

7. An automated method for checking turret repeatability in an automated optical system having an automated microscope positioned to view along an optical path, the automated method comprising the steps of:
  a) selecting a lens having a first magnification characteristic;
  b) inserting a calibration plate into the optical path, where the calibration plate includes a fiducial and the fiducial is located and centered in a field of view;
  c) incrementally moving a turret so as to repeatedly move the fiducial out of an optical axis and then back into line with the optical axis for a predetermined number of repetitions, where each time a stage returns the fiducial to an origin position, a fiducial image is captured and processed so as to determine a center of the fiducial in both axes relative to the optical axis.

8. The automated method for checking turret repeatability of claim 7 wherein turret movement alternates between clockwise and counter clockwise directions.

9. The automated method of claim 8 further comprising the steps of:
  a) developing an array of X and Y coordinates for each iteration;
  b) determining a maximum and minimum for each axis; and
  c) calculating an absolute value for a largest difference as a measure of turret repeatability 10. The automated method for checking turret repeatability of claim 9 further comprising the step of checking repeatability to a limit of repeatability of less than 7000 nm.

11. An automated method for testing objective centration and parfocality in an automated microscope system having multiple objective lenses, wherein each objective has its own optical axis, the automated method comprising the steps of:
  a) selecting a lens having a first magnification characteristic;
  b) inserting a calibration plate into a first optical path, where the calibration plate includes a fiducial and the fiducial is located and centered in a field of view, and obtaining a first set of X,Y and Z coordinates;
  c) selecting a lens having a second magnification characteristic;
  d) inserting the calibration plate into a second optical path, where the calibration plate includes a fiducial and the fiducial is located and centered in a field of view, and obtaining a second set of X,Y and Z coordinates; and
  e) subtracting the first set of X,Y and Z coordinates from the second set of X,Y and Z coordinates, where an X and Y difference comprises a centration characteristic of the objectives and a Z difference comprises a parfocality factor.

12. The automated method for checking stage performance repeatability of claim 11 further comprising the steps of:

a) checking repeatability of centration to a limit of repeatability of less than 25000 nm;

b) checking repeatability of parfocality to a limit of repeatability of less than 15000 nm.

13. An automated apparatus for checking stage performance repeatability in an automated optical system having an automated microscope positioned to view an object on a stage along an optical path, where the optical path includes an optical axis therethrough, the automated apparatus comprising:

a) a lens having a first magnification characteristic;

b) a calibration plate inserted into the optical path, where the calibration plate includes a fiducial having a fiducial center, wherein the fiducial is located and centered in a field of view;

c) means, coupled to the stage, for grossly positioning the stage in a vicinity of the fiducial;

d) means, coupled to the automated microscope, for performing a focus pan;

e) means, coupled to the stage, for determining a location of a center of the fiducial with respect to an optical axis;

f) means, coupled to the stage, for translating the stage in an X, Y plane so as to center the fiducial in the field of view, where the X, Y plane is defined by a top surface of the stage;

g) means, coupled to the stage, for recording the location of the fiducial center; and h) means, coupled to the stage, for incrementally moving the stage in a star pattern so as to repeatedly move the fiducial out of the optical axis and then back into line with the optical axis for a predetermined number of repetitions, where each time the stage returns the fiducial to an original position, an image of the fiducial is captured and processed so as to determine a lateral position of a fiducial center in the X,Y plane with respect to the optical axis.

14. The automated apparatus for checking stage performance repeatability as set forth in claim 13, where the means for incrementally moving the stage further comprises a means for moving the stage a distance suitable to identify a position repeatability characteristic.

15. The automated apparatus for checking stage performance repeatability of claim 13 further comprising:

a) means, coupled to the stage, for determining a true Z position of the image by generating a data array containing an X, Y and Z coordinate for each iteration;

b) means, coupled to the means for determining a true Z position, for processing the data array to determine a set comprising a maximum coordinate and minimum coordinate in each axis; and c) means, coupled to the means for processing the data arrays, for calculating an absolute value of a difference taken between each set so as to determine the repeatability of stage movement in each axis.

16. The automated apparatus for checking stage performance repeatability of claim 15 further comprising:

a) means, coupled to the means for processing the data arrays, for checking repeatability along an X axis to a limit of repeatability of less than 15000 nm;

b) means, coupled to the means for processing the data arrays, for checking repeatability along a Y axis to a limit of repeatability of less than 15000 nm; and c) means, coupled to the means for processing the data arrays, for checking repeatability along a Z axis to a limit of repeatability of Z cross coupling of less than 2000 nm.

17. An automated apparatus for checking stage performance repeatability in an automated optical system having an automated microscope positioned to view an object on a stage along an optical path, where the optical path includes an optical axis therethrough, and where the stage is initially positioned at an origin, the automated apparatus comprising:

a) a lens having a first magnification characteristic;

b) a calibration plate inserted into the optical path, where the calibration plate includes a fiducial and the fiducial is located and centered in a field of view;

c) means, coupled to the stage, for moving the stage along a Z axis, the Z axis being parallel to the optical axis of the lens, in a negative direction away from the lens a first distance;

d) means, coupled to the stage, for returning the stage to the origin;

e) means, coupled to the stage, for analyzing an actual Z position of an image;

f) means, coupled to the stage, for moving the stage in a negative direction for a second distance and then returning to the origin;

g) means, coupled to the stage, for analyzing the actual Z position of the image;

h) means, coupled to the stage, for reversing a direction of movement of the stage so that the stage is moved toward the lens;

i) means for storing each Z coordinate in a data array; and j) means, coupled to the storing means, for processing the data array to determine a difference between a minimum and maximum Z coordinate where an absolute value of the difference is taken as a repeatability of the stage.

* * * * *

UNITED STATES PATENT AND TRADEMARK OFFICE
CERTIFICATE OF CORRECTION

PATENT NO. : 5,499,097
DATED : Mar. 12, 1996
INVENTOR(S) : William E. Ortyn et al.

It is certified that error appears in the above-identified patent and that said Letters Patent is hereby corrected as shown below:

In the Claims

Column 17, line 45, delete the word "suitable".

Signed and Sealed this

Ninth Day of July, 1996

Attest:

BRUCE LEHMAN

Attesting Officer

Commissioner of Patents and Trademarks